(12) United States Patent
Lowes et al.

(10) Patent No.: US 12,093,694 B2
(45) Date of Patent: Sep. 17, 2024

(54) DEVICE, METHOD AND SYSTEM FOR PROVISIONING A REAL BRANCH INSTRUCTION AND A FAKE BRANCH INSTRUCTION TO RESPECTIVE DECODERS

(71) Applicant: Intel Corporation, Santa Clara, CA (US)

(72) Inventors: Mathew Lowes, Austin, TX (US); Jonathan Combs, Austin, TX (US); Martin Licht, Round Rock, TX (US)

(73) Assignee: Intel Corporation, Santa Clara, CA (US)

( * ) Notice: Subject to any disclaimer, the term of this patent is extended or adjusted under 35 U.S.C. 154(b) by 577 days.

(21) Appl. No.: 17/214,693

(22) Filed: Mar. 26, 2021

(65) Prior Publication Data

US 2022/0318020 A1 Oct. 6, 2022

(51) Int. Cl.
*G06F 9/38* (2018.01)

(52) U.S. Cl.
CPC .......... *G06F 9/3844* (2013.01); *G06F 9/3804* (2013.01); *G06F 9/3856* (2023.08)

(58) Field of Classification Search
CPC .............................. G06F 9/3804; G06F 9/3844
See application file for complete search history.

(56) References Cited

U.S. PATENT DOCUMENTS

| 7,174,444 | B2 | 2/2007 | Altshuler et al. |
| 8,578,139 | B2 | 11/2013 | Chaussade et al. |
| 10,228,949 | B2 | 3/2019 | Abdallah |
| 10,331,454 | B2 | 6/2019 | Combs |
| 10,409,612 | B2 | 9/2019 | Dixon et al. |
| 2018/0088956 | A1* | 3/2018 | Combs ................. G06F 9/3822 |

* cited by examiner

*Primary Examiner* — Jacob Petranek
(74) *Attorney, Agent, or Firm* — Essential Patents Group, LLP

(57) ABSTRACT

Techniques and mechanisms for providing branch prediction information to facilitate instruction decoding by a processor. In an embodiment, entries of a branch prediction table (BTB) each identify, for a corresponding instruction, whether a prediction based on the instruction (if any) is eligible to be communicated, with another prediction, in a single fetch cycle. A branch prediction unit of the processor determines a linear address of a fetch region which is under consideration, and performs a search of the BTB based on the linear address. A result of the search is evaluated to detect for any hit entry which indicates a double prediction eligibility. In another embodiment, where it is determined that double prediction eligibility is indicated for an earliest one the instructions represented by the hit entries, multiple predictions are communicated in a single fetch cycle.

20 Claims, 23 Drawing Sheets

| Branch address A | Target address A | Real | SPO |
| Branch address B | Target address B | Real | SPO |
| Branch address C | Next address C | Fake | DPE |
| ⋮ | ⋮ | ⋮ | ⋮ |
| Branch address D | Target address D | Real | SPO |
| Branch address E | Next address E | Fake | SPO |

510 520 530 540

500

500

| 510 | 520 | 530 | 540 |
|---|---|---|---|
| Branch address A | Target address A | Real | SPO |
| Branch address B | Target address B | Real | SPO |
| Branch address C | Next address C | Fake | DPE |
| ⋮ | ⋮ | ⋮ | ⋮ |
| Branch address D | Target address D | Real | SPO |
| Branch address E | Next address E | Fake | SPO |

FIG. 5

| 810 |
|---|
| A0 |
| A1 |
| A2 |
| A3 |
| A4 |
| A5 (taken branch) |
| B0 |
| B1 |
| B2 |
| B3 |
| B4 (fake branch) |
| C0 |
| C1 |
| C2 |
| C3 |
| D0 |
| D1 |
| D2 |
| D3 (weight high) |
| E0 |
| E1 |
| E2 |
| ⋮ |

FIG. 8A

| 820 |
|---|
| A0 |
| A1 |
| A2 |
| A3 |
| A4 |
| A5 (taken branch) |
| C0 |
| C1 |
| C2 |
| C3 |
| D0 |
| D1 |
| D2 |
| D3 (weight high) |

FIG. 8B

| 825 |
|---|
| B0 |
| B1 |
| B2 |
| B3 |
| B4 (fake branch) |
| E0 |
| E1 |
| E2 |
| ⋮ |

FIG. 8C

| 830 |
|---|
| uop for A4 |
| uop for A5 (toggle set) |
| uop for C0 |

FIG. 8D

| 835 |
|---|
| uop for B0 |
| uop for B1 |
| uop for B2 |

FIG. 8E

| 840 |
|---|
| uop for A4 |
| uop for A5 |
| uop for B0 |

FIG. 8F

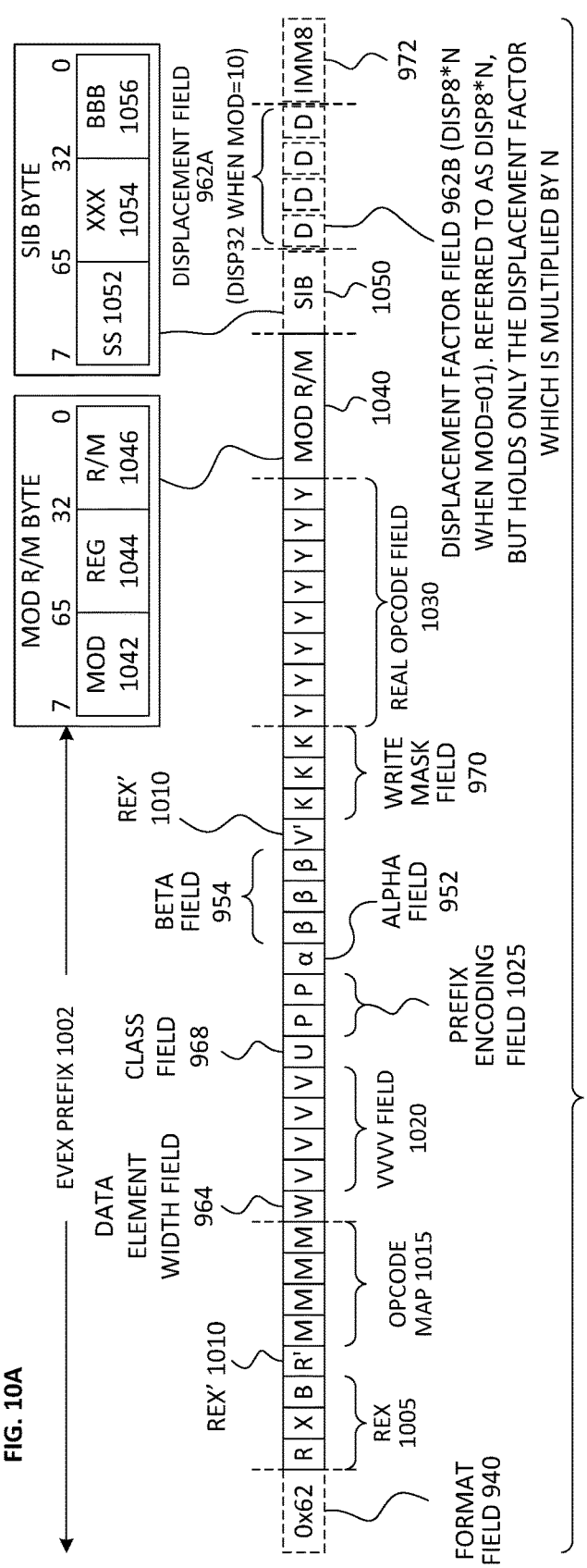
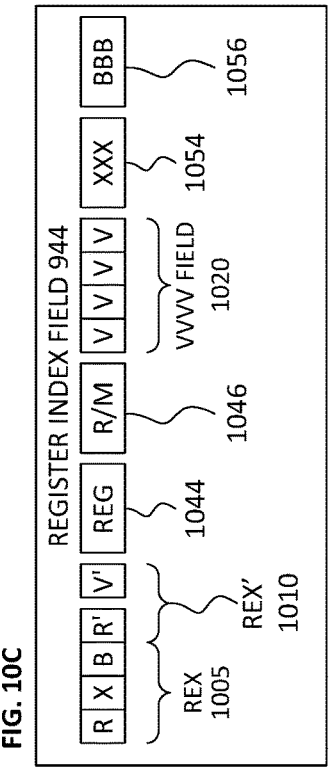
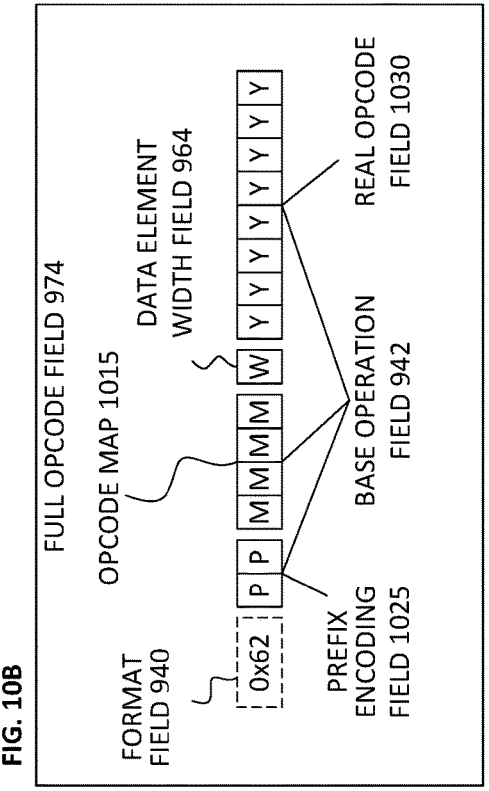
FIG. 10A
FIG. 10B
FIG. 10C

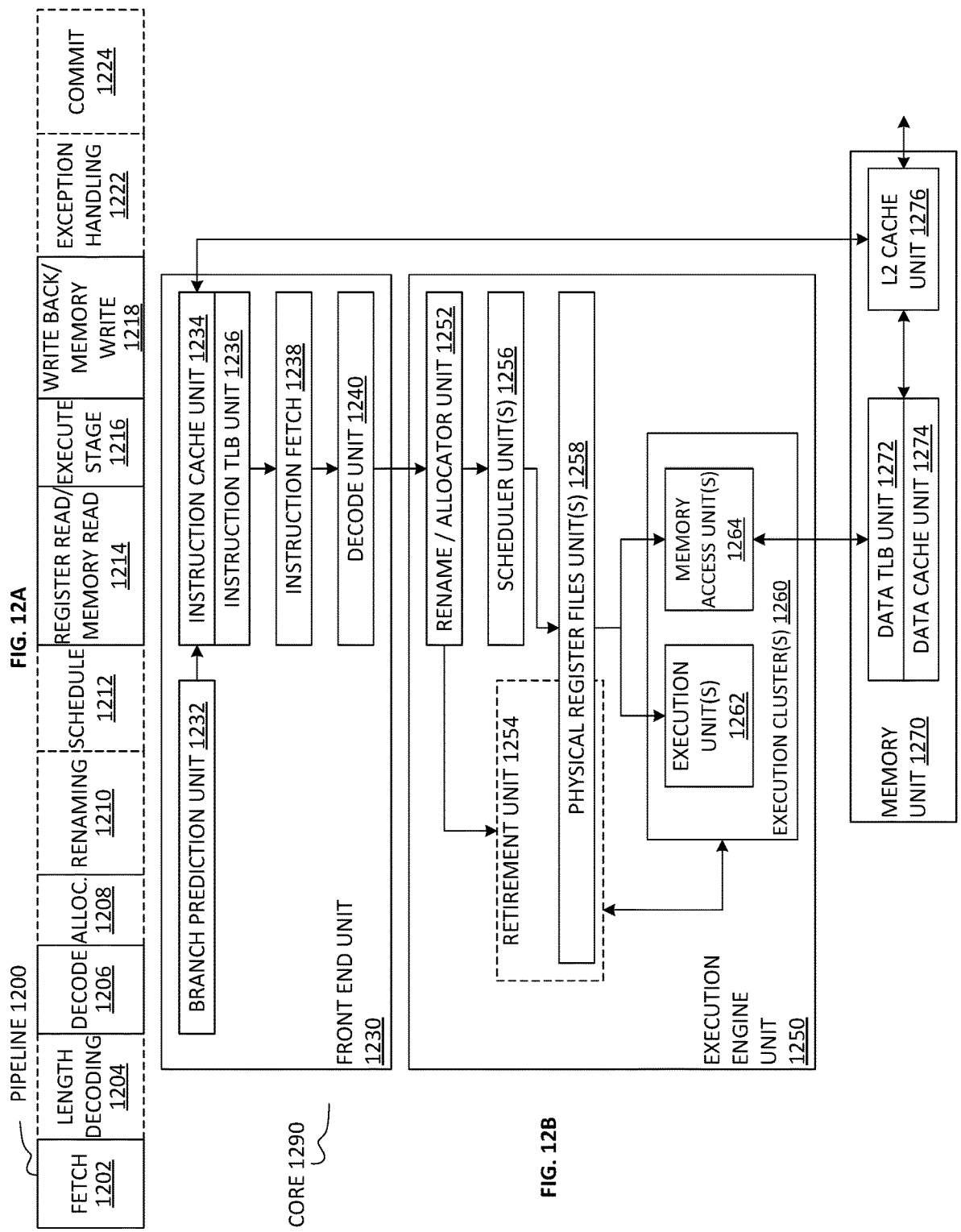

DEVICE, METHOD AND SYSTEM FOR PROVISIONING A REAL BRANCH INSTRUCTION AND A FAKE BRANCH INSTRUCTION TO RESPECTIVE DECODERS

BACKGROUND

1. Technical Field

This disclosure generally relates to data processors and more particularly, but not exclusively, to solutions for provisioning instructions to respective decoders.

2. Background Art

Improving computer architecture performance is a difficult task. Improvements have been sought through frequency scaling, Single Instruction Multiple Data (SIMD), Very Long Instruction Word (VLIW), multi-threading and multiple processor techniques. These approaches mainly target improvements in the throughput of program execution. Many of the techniques require software to explicitly unveil parallelism. In contrast, frequency scaling improves both throughput and latency without requiring software explicit annotation of parallelism. Recently, frequency scaling hit a power wall so improvements through frequency scaling are difficult. Thus, it is difficult to increase throughput unless massive explicit software parallelization is expressed.

With respect to a single program thread, program execution is typically controlled by branching instructions that dictate the program control flow. Program instruction sequences are dynamic when the branching instructions are conditional or the branch target is indirect. In such cases, fetch logic of the processor needs to find out for a given conditional branch if the branch is taken or not taken. This enables the fetch logic to bring in the sequence of instructions that either follow the target of the branch or those that follows the branch instruction itself. There exists a problem, however, in that at the fetch stage, the outcome of the condition of the branch is not known before the branch itself executes.

In an attempt to overcome this problem, prior art designs have implemented branch prediction logic to predict the outcome of a branch. At the fetch stage of the microprocessor, the predicted outcome enables the fetch logic to anticipate where to bring the next sequence of instructions from. As successive generations of processors continue to scale in size, speed and capability, there is expected to be an increasing premium placed on improvements to instruction execution.

BRIEF DESCRIPTION OF THE DRAWINGS

The various embodiments of the present invention are illustrated by way of example, and not by way of limitation, in the figures of the accompanying drawings and in which:

FIG. 5 is an illustration of an example branch target buffer in which entries are annotated with information usable to trigger a load balancing action between decode clusters according to an embodiment.

FIGS. 8A-8F illustrate an example of the application of out-of-order clustered decoding with load balancing according to an embodiment.

FIGS. 10A through 10D are block diagrams illustrating an exemplary specific vector friendly instruction format according to embodiments of the invention.

FIG. 12A is a block diagram illustrating both an exemplary in-order pipeline and an exemplary register renaming, out-of-order issue/execution pipeline according to embodiments of the invention.

FIG. 12B is a block diagram illustrating both an exemplary embodiment of an in-order architecture core and an exemplary register renaming, out-of-order issue/execution architecture core to be included in a processor according to embodiments of the invention.

DETAILED DESCRIPTION

Figure 1:
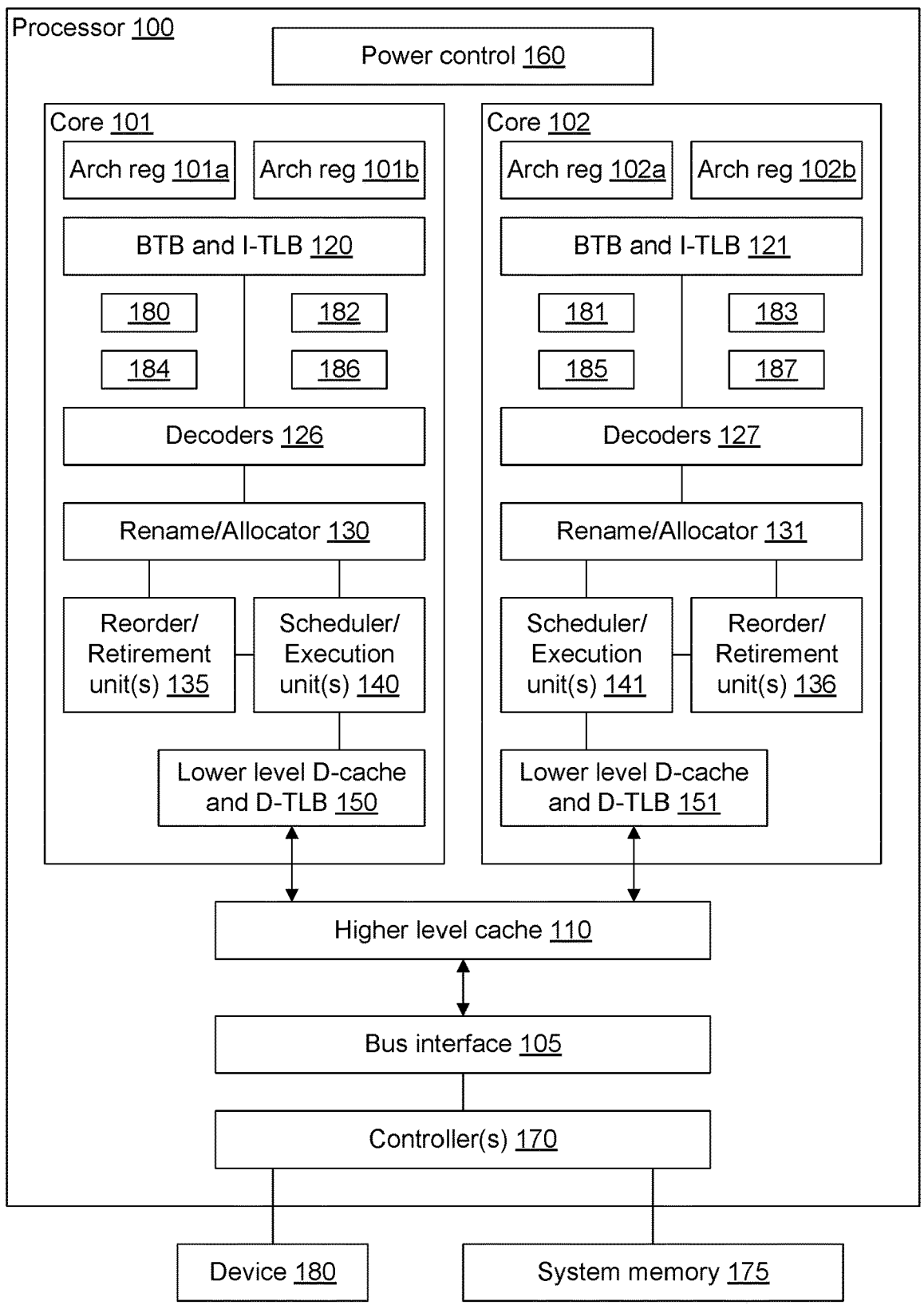
FIG. 1 illustrates a data processing system to perform clustered decoding according to an embodiment.

Embodiments discussed herein variously provide techniques and mechanisms for providing branch prediction information to facilitate instruction decoding by a processor. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including a processor which comprises multiple decode clusters.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

As described herein, some processors architectures variously provide instruction decoding with groups (or "clusters") of decoders, where such groups are arranged in an in-parallel configuration. Traditionally, in some of these architectures, decode clusters are coupled to different respective branch prediction queues, which variously receive identifiers of instructions that are predicted to be executed. For example, for a given identifier of a predicted instruction (for brevity, also referred to herein as a "prediction"), a respective entry of a branch target buffer (BTB) stores an address of the predicted instruction—e.g., wherein the BTB entry in question corresponds to an instruction which precedes the predicted instruction in a program sequence.

In some embodiments, to facilitate load balancing between multiple decode clusters, a processor provides functionality to distinguish between two types of instructions—i.e., referred to herein as a "real branch" instruction type and a "fake branch" instruction type. In this particular context, a "real" branch instruction is an actual branch instruction—i.e., where the execution of said branch instruction evaluates a condition to determine which, of two or more possible instructions, is a next instruction to be executed. By contrast, a "fake" branch instruction is a sequential instruction for which a respective next instruction to be executed is predetermined. For the purpose of instruction fetching, a fake branch instruction is to be treated as a branch instruction in one or more respects—e.g., where, for a given fake branch instruction, the predetermined next instruction to be executed is indicated as the respective "predicted" target instruction.

For example, to avoid an inefficient fetching of a long stream of sequential instructions to one decode cluster (e.g., while another decode cluster is underutilized), some more recent processor architectures toggle between decode clusters with the use of a fake branch instruction. However, in conventional architectures, the addition of such a fake branch instruction increases the number of cycles required to fetch instructions of said code stream. By contrast, some embodiments enable the communication of multiple predictions in a single fetch cycle, thereby reducing the delay associated with conventional branch prediction and instruction fetching solutions.

Referring to FIG. 1, an embodiment of a processor including multiple cores is illustrated. Processor 100 includes any processor or processing device, such as a microprocessor, an embedded processor, a digital signal processor (DSP), a network processor, a handheld processor, an application processor, a co-processor, or other device to execute code. Processor 100, in one embodiment, includes at least two cores—core 101 and 102, which may include asymmetric cores or symmetric cores (the illustrated embodiment). However, processor 100 may include any number of processing elements that, for example, are symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores, core 101 and 102. Here, core 101 and 102 are considered symmetric cores, i.e., cores with the same configurations, functional units, and/or logic. In another embodiment, core 101 includes an out-of-order processor core, while core 102 includes an in-order processor core. However, cores 101 and 102 are adapted from any of various suitable types of cores, such as a native core, a software managed core, a core adapted to execute a native Instruction Set Architecture (ISA), a core adapted to execute a translated Instruction Set Architecture (ISA), a co-designed core, or other known core. Yet to further the discussion, the functional units illustrated in core 101 are described in further detail below, as the units in core 102 operate in a similar manner.

As depicted, core 101 includes two hardware threads 101a and 101b, which are also referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread is associated with architecture state registers 102a, and a fourth thread is associated with architecture state registers 102b. Here, each of the architecture state registers (101a, 101b, 102a, and 102b) variously provide functionality as processing elements, thread slots, or thread units, as described above. As illustrated, architecture state registers 101a are replicated in architecture state registers 101b, so individual architecture states/contexts are capable of being stored for respective logical processors. In core 101, other smaller resources, such as instruction pointers and renaming logic in rename allocator logic 130 are replicated for threads 101a and 101b. Some resources, such as re-order buffers in reorder/retirement unit 135, branch target buffer (BTB) and instruction translation lookaside buffer (I-TLB) 120, load/store buffers, and queues are shared through partitioning. Other resources, such as general purpose internal registers, page-table base register(s), low-level data-cache and data-TLB 115, execution unit(s) 140, and portions of out-of-order unit 135 are potentially fully shared.

In various embodiments, processor 100 includes other resources, which (for example) are fully shared, shared through partitioning, or dedicated by/to processing elements. In FIG. 1, an embodiment of an exemplary processor with illustrative logical units/resources of a processor is illustrated. Note that, in different embodiments, a processor includes, or omits, any of these functional units, and/or includes any of various known functional units, logic, or firmware not depicted. As illustrated, core 101 includes a simplified, representative out-of-order (OOO) processor core. But an in-order processor is utilized in different embodiments. The OOO core includes a branch target buffer 120 to predict branches to be executed/taken and an instruction-translation buffer (I-TLB) 120 to store address translation entries for instructions.

Core 101 further includes decoders 126, which are coupled to fetch unit circuitry (not shown), to decode fetched elements. Fetch logic, in one embodiment, includes individual sequencers associated with thread slots 101a, 101b, respectively. In various embodiments, core 101 is associated with a first Instruction Set Architecture (ISA), which defines/specifies instructions executable on processor 100. Often machine code instructions that are part of the first ISA include a portion of the instruction (referred to as an opcode), which references/specifies an instruction or operation to be performed. Decoders 126 includes circuitry that recognizes these instructions from their opcodes and passes the decoded instructions on in the pipeline for processing as defined by the first ISA. As a result of the recognition by decoders 126, the architecture or core 101 takes specific, predefined actions to perform tasks associated with the appropriate instruction. In various embodiments, any of the tasks, blocks, operations, and methods described herein are performed in response to a single or multiple instructions; some of which, for example, are new or old instructions. As illustrated in FIG. 1, the processor 100 includes power control 160 and core 102 includes its own BTB and I-TLB 121, decoders 127, rename/allocator unit 131, scheduler/execution units 141, reorder/retirement unit 136 and low level D-Cache and D-TLB 151.

Referring again to core 101, BTB 120 (for example) comprises entries which each correspond to a respective instruction, and which each identify a target address of a respective predicted next instruction after the corresponding instruction. As described herein, metadata of a given BTB entry, in some embodiments, identifies the corresponding instruction as being one of a real branch instruction type, or a fake branch instruction type. Additionally or alternatively, such metadata includes a parameter—referred to herein as a double prediction eligibility state (DPES) parameter—associated with the corresponding instruction.

For a given entry of a BTB, a respective DPES parameter of that entry indicates whether the instruction represented by said BTB entry is double prediction eligible (DPE) or, alternatively, single prediction only eligible (SPO). In this particular context, "double prediction eligible," "double prediction eligibility" and related terms variously refer herein to the eligibility of a prediction (if any)—where said prediction is based on the instruction represented by the BTB entry in question—to be communicated in a same fetch cycle with another prediction (e.g., a predicted later instruction in a particular instruction sequence).

By contrast, "single prediction only eligible," "single prediction only eligibility," (as well as "non-double prediction eligible," "non-double prediction eligibility" etc.) and related terms variously refer to an absence of double prediction eligibility—e.g., wherein a prediction, if any, which is based on a corresponding instruction does not allow for a later prediction (later with respect to the instruction sequence) to also be communicated in a same fetch cycle.

As described herein, decoders 126 (or, for example, other such instruction decode circuitry such as decoders 127) are arranged, in various embodiments, to provide multiple decode clusters which operate in parallel with each other. To facilitate load balancing between said decode clusters, branch prediction logic of a processor core accesses a BTB to detect for one or more instructions which are each to determine a point of delineation between instructions which are to be variously fetched for decoding by different respective decode clusters.

By way of illustration and not limitation, branch prediction logic of core 101 comprises the illustrative detector circuitry 180, search circuitry 182, registration circuitry 184, and evaluation circuitry 186 of core 101. In one such embodiment, core 102 additionally or alternatively comprises detector circuitry 181, search circuitry 183, registration circuitry 185, and evaluation circuitry 187 which (respectively) correspond functionally to detector circuitry 180, search circuitry 182, registration circuitry 184, and evaluation circuitry 186.

In various embodiments, detector circuitry 180 provides functionality to detect that BTB 120 is to provide a first entry representing a respective first instruction. For example, as described herein, detector circuitry 180 receives or otherwise detects a signal (e.g., generated according to conventional branch prediction techniques) indicating that said first instruction is classified—or is to be classified—as being one of a real branch instruction type, or a fake branch instruction type. In an illustrative scenario according to one such embodiment, detector circuitry 180 determines addressing information with which the first entry is to be accessed—e.g., wherein such determining is based on a fake branch instruction type of the first instruction, and/or wherein the addressing information identifies a specific set and way of the BTB.

Based on the addressing information determined by detector circuitry 180, search circuitry 182 performs a search of the BTB to identify any other BTB entries which are also addressable at least in part with some or all of the same addressing information. For example, the BTB is a set associative BTB, in some embodiments, wherein search circuitry 182 performs the search to identify one or more entries (ways) in a set of the BTB which also includes the first entry.

In one such embodiment, the BTB search results are provided by search circuitry 182 to registration circuitry 184, which evaluates some or all DPES parameters of the identified one or more BTB entries, and which—based on said evaluation—registers in the first entry the value of a first DPES parameter. In one such embodiment, the value of the first DPES parameter is determined based on a requirement that, for any BTB entries which are addressable at least in part by some common type of addressing information, only the DPES parameter of one such BTB entry is able to indicate double prediction eligibility.

Registration circuitry 184 provides functionality to determine whether, in a given fetch cycle, any one or more predictions are to be communicated each to a respective branch prediction queue, decode cluster, or other such resource. In various embodiments, such determining by registration circuitry 184 is based on one or more DPES parameters in the BTB. In one illustrative embodiment, two predictions are to be communicated in a single fetch cycle where, for example, one such prediction, which is earlier than the other prediction (i.e., earlier with respect to an instruction sequence), is represented by a BTB entry which indicates double prediction eligibility.

In various embodiments, allocator and renamer block 130 includes an allocator to reserve resources, such as register files to store instruction processing results. However, threads 101a and 101b are potentially capable of out-of-order execution, where allocator and renamer block 130 also reserves other resources, such as reorder buffers to track instruction results. In some embodiments, unit 130 also includes a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, one such processor includes a page table structure to break physical memory into a plurality of virtual pages.

Here, cores 101 and 102 share access to higher-level or further-out cache 110, which is to cache recently fetched elements. Note that higher-level or further-out refers to cache levels increasing or getting further way from the execution unit(s). In one embodiment, higher-level cache 110 is a last-level data cache—last cache in the memory hierarchy on processor 100—such as a second or third level data cache. However, higher level cache 110 is not so limited, as it may be associated with or include an instruction cache. A trace cache—a type of instruction cache—instead may be coupled after decoders 126 to store recently decoded instruction traces.

In the depicted configuration, processor 100 also includes bus interface module 105. In some embodiments, controller 170, which is described in more detail below, is included in a computing system external to processor 100. In this scenario, bus interface 105 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this exemplary configuration, bus 105 may include any known interconnect, such as multi-drop bus, a point-to-point interconnect, a serial interconnect, a parallel bus, a coherent (e.g., cache coherent) bus, a layered protocol architecture, a differential bus, and a GTL bus.

In some embodiments, memory 175 is dedicated to processor 100 or (alternatively) is shared with other devices in a system. Common examples of types of memory 175 include dynamic random access memory (DRAM), static RAM (SRAM), non-volatile memory (NV memory), and other known storage devices. In various embodiments, device 180 includes a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 170 is illustrated as part of processor 100—e.g., where one or more such devices are integrated on a single die, such as System on a Chip (SOC), which comprises processor 100. For example in one embodiment, memory controller hub 170 is on the same package and/or die with processor 100. Here, a portion of the core (an on-core portion) includes one or more controller(s) 170 for interfacing with other devices such as memory 175 or a graphics device 180. The configuration including an interconnect and/or controllers for interfacing with such devices is often referred to as an on-core (or un-core configuration). As an example, bus interface 105 includes a ring interconnect with a memory controller for interfacing with memory 175 and a graphics controller for interfacing with graphics device 180. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

Figure 2:
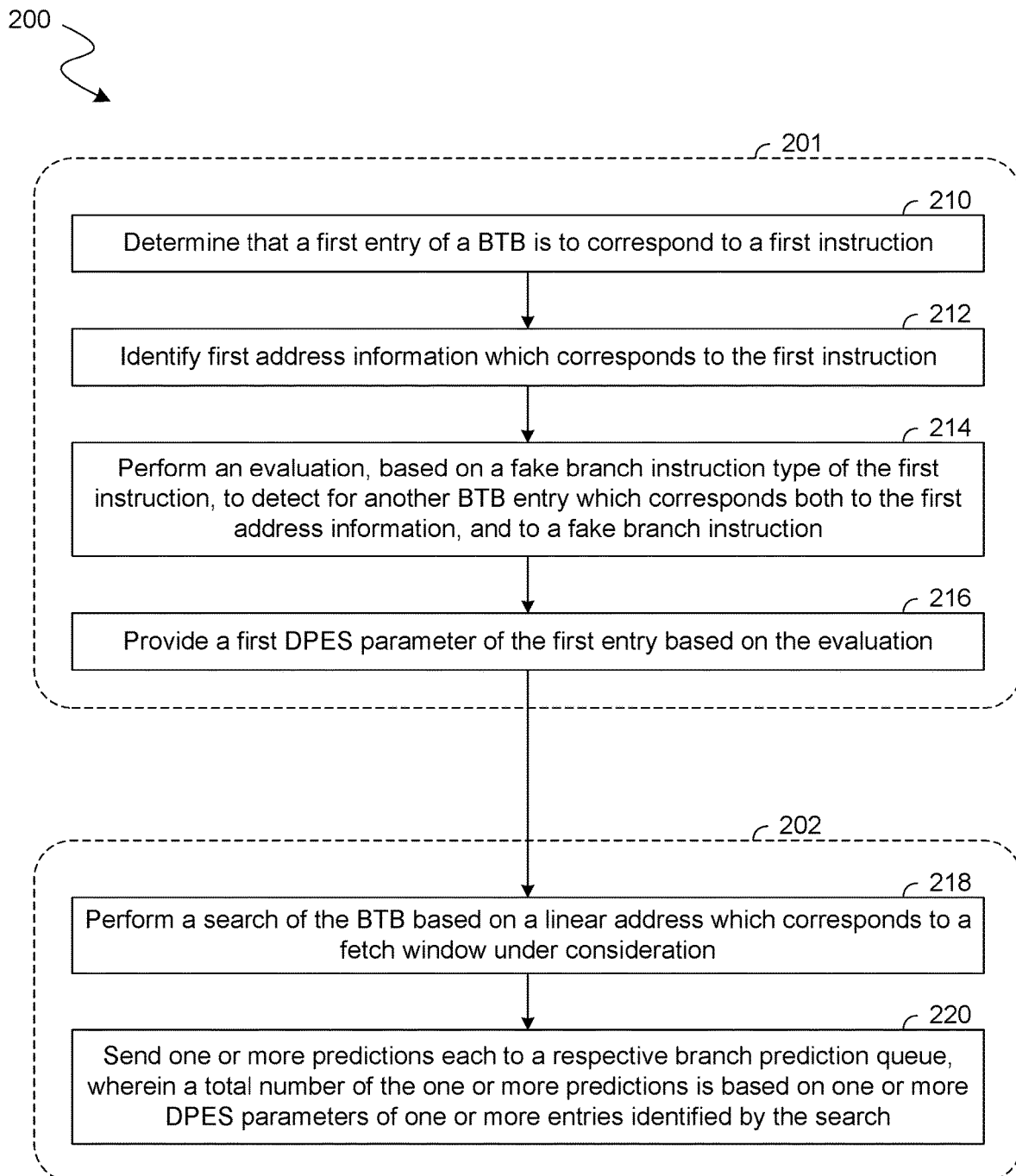
FIG. 2 is an illustration of a method for decoding instructions according to an embodiment.

FIG. 2 shows features of a method 200 for operating branch prediction circuitry of a processor according to an embodiment. Method 200 illustrates one example of an embodiment wherein the communication of one or more instruction predictions in a given fetch cycle is determined based on BTB entries which indicate respective double prediction eligibility states each for a corresponding real branch instruction or fake branch instruction. Operations such as those of method 200 are performed, for example, with some or all of detector circuitry 180, search circuitry 182, registration circuitry 184, and evaluation circuitry 186 (or, for example, with some or all of detector circuitry 181, search circuitry 183, registration circuitry 185, and evaluation circuitry 187).

In the illustrative embodiment shown, method 200 comprises operations 201 to provide an entry of a BTB—e.g., wherein the BTB entry (and/or another entry of the same BTB) is to serve as a basis for determining the fetching of one or more instructions to instruction decoder circuitry. As shown in FIG. 2, operations 201 comprise (at 210) determining that a BTB is to provide a first entry which corresponds to a first instruction. For example, the first entry is to include a target address—i.e., an address which targets a predicted or otherwise expected next instruction to be executed after the corresponding first instruction. In some embodiments, the first entry is to further comprise metadata which identifies of the corresponding first instruction as belonging to one of a real branch instruction type, or a fake branch instruction type.

Operations 201 further comprise (at 212) identifying first address information which corresponds to the first instruction. For example, the first entry is addressable in the BTB with one or more values which are based on a linear address for the first instruction. In an example embodiment, the BTB is a set associative BTB, wherein sets of the BTB each correspond to (and are addressed by) a different respective tag term, and wherein ways of one such set each correspond to a different respective combination of an index term and an offset term. In one such embodiment, determining the first address information at 210 comprises identifying a first tag term, and a first index term, and a first offset term for the first entry. In various embodiments, the determining at 210 and/or the identifying at 212 is performed, for example, with detector circuitry 180 (or detector circuitry 181).

Operations 201 further comprise (at 214) performing an evaluation—based on a classification of the first instruction as being one of a fake branch instruction type—to detect whether the BTB includes any one or more other entries which each correspond both to the first address information, and to a respective instruction which is of the fake branch instruction type. In one embodiment, the evaluation at 214 includes a search of the BTB to identify any other BTB entries which are addressable with the same first tag value and first index value which are used to address the first entry. The evaluation at 214 is performed, for example, with search circuitry 182 (or search circuitry 183), in one example embodiment.

Operations 201 further comprise (at 216) providing a first double prediction eligibility state (DPES) parameter of the first entry based on the evaluation at 214. The providing at 216 is performed, for example, with registration circuitry 184 (or registration circuitry 185). In various embodiments, whether the first DPES parameter is to indicate double prediction eligibility (or merely single prediction eligibility) is to be determined based on a requirement that, for a given fetch region under consideration, only one fake branch instruction of the fetch region can be double prediction eligibility.

For example, in one illustrative scenario, performing the evaluation at 214 comprises detecting a condition wherein, for any BTB entry—other than the first entry—which also corresponds to the first address information (e.g., to a first tag value and a first index value), the DPES parameter of said entry indicates only single prediction eligibility. Based on such a condition, the first DPES parameter provided at 216 indicates a double prediction eligibility for a prediction based on the first instruction.

In another example scenario, performing the evaluation at 214 instead comprises detecting a different condition wherein, for at least one entry of the BTB—other than the first entry—which also corresponds to the first address information, the DPES parameter of said entry indicates double prediction eligibility. Based on such a condition, the first DPES parameter provided at 216 indicates a single prediction eligibility for a prediction based on the first instruction.

In various embodiments, method 200 additionally or alternatively comprises operations 202 to determine, based on the BTB, a number of predictions which are to be provided, during a single fetch cycle, to determine a fetching of instructions for respective decode clusters. Operations 202 are performed with evaluation circuitry 186 (or evaluation circuitry 187), for example.

As shown in FIG. 2, operations 202 comprise (at 218) performing a search of the BTB based on a linear address which corresponds to a fetch region under consideration, wherein the search identifies one or more entries of the BTB. The performing at 218 includes or is otherwise based on a parsing or other processing of the linear address to determine one or more search terms—e.g., including, a tag search term, an index search term, and an offset search term to search a set associative BTB.

Operations 202 further comprise (at 220) sending one or more predictions, during a single fetch cycle, each to a respective branch prediction queue. In an embodiment, a total number of the one or more predictions is based on one or more DPES parameters of the one or more entries which are identified by the search performed at 218. In an illustrative scenario according to one embodiment, operations 202 detect a condition wherein only one entry of the BTB is hit by the search performed at 218. Based on this condition, only one prediction is sent at 220 during the single fetch cycle.

In another illustrative scenario according to one embodiment, operations 202 instead detect an alternative condition wherein two entries of the BTB are hit by the search at 218, wherein the respective DPES parameter of one of the two entries indicates double prediction eligibility, and wherein the respective DPES parameter of the other of the two entries indicates only single prediction eligibility. Based on such an alternative condition, operations 202 further determine whether the one of the two entries (i.e., the entry indicating double prediction eligibility) comes before the other of the two entries in a sequence of instructions. Where the one of the two entries comes before the another of the two entries in the sequence, two predictions are sent at 220 during the single fetch cycle. Otherwise, only one prediction is sent at 220 during the single fetch cycle.

Figure 3:
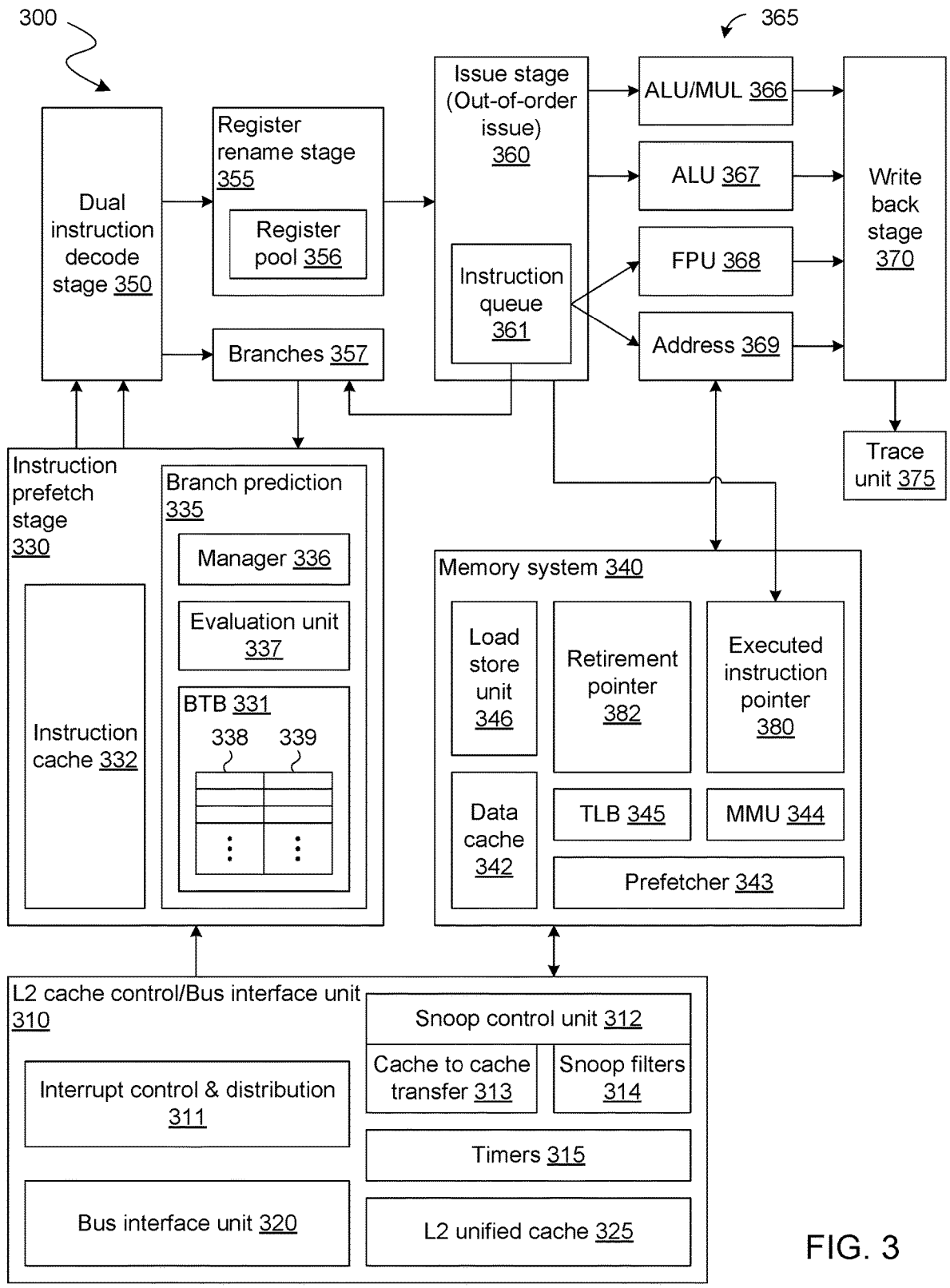
FIG. 3 is a block diagram of an instruction set architecture of a processor, according to an embodiment.

FIG. 3 is a more detailed block diagram of an instruction set architecture 300 of a processor, in accordance with various embodiments. Instruction set architecture 300 implements one or more aspects of processor 100, for example—e.g., wherein one or more operations of method 200 are performed with circuitry of instruction set architecture 300. Furthermore, instruction set architecture 300 illustrates modules and mechanisms for the execution of instructions within a processor, according to some embodiments.

Instruction set architecture 300 includes a memory system 340 communicatively coupled to one or more execution entities 365. Furthermore, instruction set architecture 300 includes a caching and bus interface unit such as unit 310 communicatively coupled to execution entities 365 and memory system 340. In one embodiment, loading of instructions into execution entities 365 are performed by one or more stages of execution. Such stages include, for example, instruction prefetch stage 330, dual instruction decode stage 350, register rename stage 355, issue stage 360, and writeback stage 370.

In one embodiment, memory system 340 includes an executed instruction pointer 380. Executed instruction pointer 380 stores a value identifying the oldest, undispatched instruction within a batch of instructions. The oldest instruction corresponds to the lowest Program Order (PO) value. A PO includes a unique number of an instruction. Such an instruction is a single instruction within a thread represented by multiple strands. A PO is used in ordering instructions to ensure correct execution semantics of code. A PO is reconstructed by mechanisms such as evaluating increments to PO encoded in the instruction rather than an absolute value. Such a reconstructed PO is known as an "RPO." Although a PO is referenced herein, such a PO is used interchangeably with an RPO. A strand includes a sequence of instructions that are data dependent upon each other. The strand is arranged by a binary translator at compilation time. Hardware executing a strand executes the instructions of a given strand in order according to the PO of the various instructions. A thread includes multiple strands such that instructions of different strands may depend upon each other. A PO of a given strand is the PO of the oldest instruction in the strand which has not yet been dispatched to execution from an issue stage. Accordingly, given a thread of multiple strands, each strand including instructions ordered by PO, executed instruction pointer 380 stores the oldest—illustrated by the lowest number—PO in the thread.

In another embodiment, memory system 340 includes a retirement pointer 382. Retirement pointer 382 stores a value identifying the PO of the last retired instruction. Retirement pointer 382 is set by, for example, reorder/retirement unit 135. If no instructions have yet been retired, retirement pointer 382 includes a null value.

Execution entities 365 include any suitable number and kind of mechanisms by which a processor executes instructions. In the example of FIG. 3, execution entities 365 include ALU/multiplication units (MUL) 366, ALUs 367, and floating point units (FPU) 368. In one embodiment, such entities may make use of information contained within a given address 369. Execution entities 365 in combination with stages 330, 350, 355, 360, 370 may collectively form an execution unit.

Unit 310 is implemented in any suitable manner. In one embodiment, unit 310 performs cache control. In such an embodiment, unit 310 may thus include a cache 325. Cache 325 is implemented, in a further embodiment, as an L2 unified cache with any suitable size, such as zero, 128 k, 256 k, 512 k, 1M, or 2M bytes of memory. In another, further embodiment, cache 325 is implemented in error-correcting code memory. In another embodiment, unit 310 performs bus interfacing to other portions of a processor or electronic device. In such an embodiment, unit 310 may thus include a bus interface unit 320 for communicating over an interconnect, intraprocessor bus, interprocessor bus, or other communication bus, port, or line. Bus interface unit 320 provides interfacing in order to perform, for example, generation of the memory and input/output addresses for the transfer of data between execution entities 365 and the portions of a system external to instruction set architecture 300.

To further facilitate its functions, bus interface unit 310 includes an interrupt control and distribution unit 311 for generating interrupts and other communications to other portions of a processor or electronic device. In one embodiment, bus interface unit 310 includes a snoop control unit 312 that handles cache access and coherency for multiple processing cores. In a further embodiment, to provide such functionality, snoop control unit 312 includes a cache-to-cache transfer unit 313 that handles information exchanges between different caches. In another, further embodiment, snoop control unit 312 includes one or more snoop filters 314 that monitor the coherency of other caches (not shown) so that a cache controller, such as unit 310, does not have to perform such monitoring directly. Unit 310 includes any suitable number of timers 315 for synchronizing the actions of instruction set architecture 300.

Memory system 340 includes any suitable number and kind of mechanisms for storing information for the processing needs of instruction set architecture 300. In one embodiment, memory system 340 includes a load store unit 346 for storing information such as buffers written to or read back from memory or registers and a data cache 342. In another embodiment, memory system 340 includes a translation lookaside buffer (TLB) 345 that provides look-up of address values between physical and virtual addresses. In yet another embodiment, memory system 340 includes a memory management unit (MMU) 344 for facilitating access to virtual memory. In still yet another embodiment, memory system 340 includes a prefetcher 343 for requesting instructions from memory before such instructions are actually needed to be executed, in order to reduce latency.

The operation of instruction set architecture 300 to execute an instruction is performed through different stages. For example, using unit 310 instruction prefetch stage 330 accesses an instruction through prefetcher 343. Instructions retrieved are stored in instruction cache 332. In some embodiments, prefetch stage 330 enables an option for fast-loop mode, wherein a series of instructions forming a loop that is small enough to fit within a given cache are executed, in one embodiment, such an execution is performed without needing to access additional instructions from, for example, instruction cache 332. Determination of what instructions to prefetch is made by, for example, branch prediction unit 335, which (for example) includes or otherwise has access to a resource—such as the illustrative branch target buffer (BTB) 331 shown—to facilitate a determination as to which of branches 357 of code will be executed next. Such branches are possibly prefetched as a result. Branches 357 are produced through other stages of operation as described below. Instruction prefetch stage 330 provides instructions as well as any predictions about future instructions to dual instruction decode stage 350.

Branch prediction unit 335 includes—or alternatively, is coupled to—a manager 336 which, for example, provides some or all of the functionality of detector circuitry 180, search circuitry 182, and registration circuitry 184 (or detector circuitry 181, search circuitry 183, and registration circuitry 185). For example, each given entry of BTB 331 comprises a respective target address 338 of a predicted next instruction after the instruction which the given entry represents. Furthermore, as described in more detail herein, a given entry of BTB 331 also comprises metadata 339 comprising a DPES parameter (and, in some embodiments, an identifier of a particular one of a real branch instruction type or a fake branch instruction type). In one such embodiment, manager 336 variously provides the respective values of some or all such DPES parameters—e.g., wherein evaluation unit 337 (providing functionality of evaluation circuitry 186, for example) evaluates one or more DPES parameters of BTB 331 to determine how any one or more predictions are to be communicated in a given fetch cycle.

Dual instruction decode stage 350 translates a received instruction into microcode-based instructions that are executed. Dual instruction decode stage 350 provides functionality to simultaneously decode two instructions per clock cycle. Furthermore, dual instruction decode stage 350 passes its results to register rename stage 355. In addition, dual instruction decode stage 350 determines any resulting branches from its decoding and eventual execution of the microcode. Such results are input into branches 357.

Register rename stage 355 translates references to virtual registers or other resources into references to physical registers or resources. Register rename stage 355 includes indications of such mapping in a register pool 356. Register rename stage 355 alters the instructions as received and send the result to issue stage 360.

Issue stage 360 issues or dispatches commands to execution entities 365. Such issuance is performed, for example, in an out-of-order fashion. In one embodiment, multiple instructions are held at issue stage 360 before being executed. Issue stage 360 includes an instruction queue 361 for holding such multiple commands. Instructions are issued by issue stage 360 to a particular processing entity 365 based upon any acceptable criteria, such as availability or suitability of resources for execution of a given instruction. In one embodiment, issue stage 360 reorders the instructions within instruction queue 361—e.g., whereby the first instructions are not executed until after other instructions. Based upon the ordering of instruction queue 361, additional branching information is provided to branches 357. Issue stage 360 passes instructions to executing entities 365 for execution.

Upon execution, writeback stage 370 writes data into registers, queues, or other structures of instruction set architecture 300 to communicate the completion of a given command. Depending upon the order of instructions arranged in issue stage 360, the operation of writeback stage 370 enables additional instructions to be executed. Performance of instruction set architecture 300 is monitored or debugged by trace unit 375.

Figure 4:
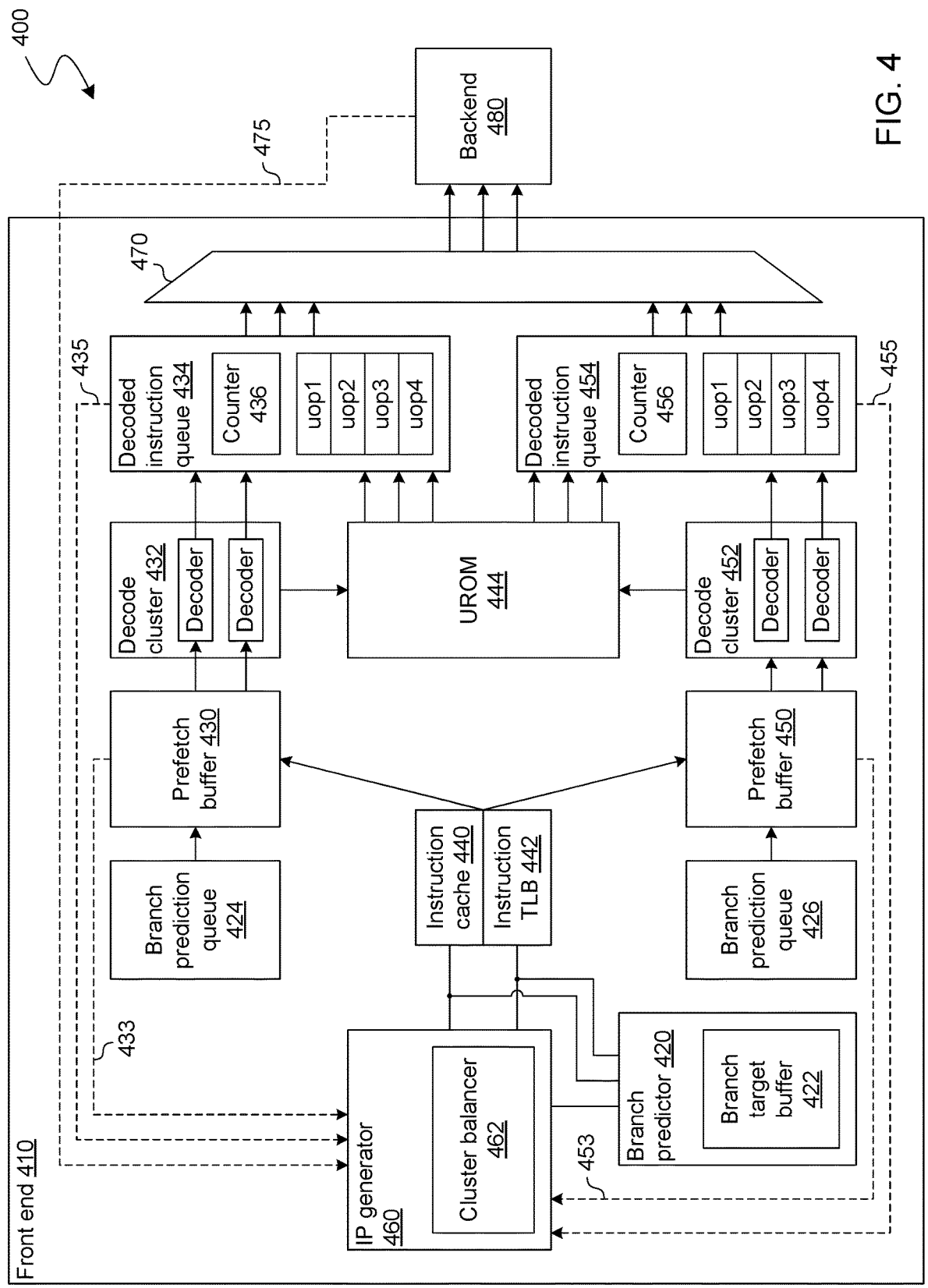
FIG. 4 is an illustration of an example processor core for applying load balancing in out-of-order clustered decoding according to an embodiment.

FIG. 4 shows features of a processor core 400 to determine a number of predictions to be provided in one fetch cycle according to an embodiment. The processor core 400 illustrates one example of an embodiment wherein one or more instruction predictions (e.g., multiple instruction predictions) are communicated during a single fetch cycle, based on DPES parameters of a BTB, to facilitate load balancing between decode clusters. In various embodiments, processor core 400 provides functionality such as that of core 101, core 102, or a core of instruction set architecture 300—e.g., wherein one or more operations of method 200 are performed with processor core 400.

As shown in FIG. 4, processor core 400 includes a processor core front end 410 and a processor core back end 480. Front end 410 includes an instruction pointer (IP) generator 460, which includes a cluster balancer 462, a branch predictor 420, which includes a branch target buffer (BTB) 422, and a merging component 470.

Front end 410 includes a branch predictor 420, which is coupled to (or alternatively, includes) two branch prediction queues 424 and 426. In various embodiments, branch predictor 420 is similar to, and may implement the functionality of, branch prediction unit 335 illustrated in FIG. 3. In one embodiment, the data elements stored in prediction queues 424 and 426 include instruction pointer values indicating instructions at which a branch was taken. In one embodiment, each of these branch prediction queues 424 and 426 include storage for up to eight entries. In other embodiments, either or both of these branch prediction queues 424 and 426 store other numbers of entries. Branch predictor 420 also includes or is otherwise coupled to access any of various other elements required to perform branch prediction, such as hardware circuitry to implement branch prediction logic, one or more buffers or queues (including a branch target buffer), or other hardware circuitry and/or logic elements (not shown).

Front end 410 also includes a prefetch buffer 430 to store data elements representing undecoded instructions to be decoded by decode cluster 432 and a prefetch buffer 450 to store data elements representing undecoded instructions to be decoded by decode cluster 452. Front end 410 also includes an instruction cache 440, and an instruction translation lookaside buffer (TLB) 442. In one embodiment, instruction cache 440 includes storage for up to 32K bytes of data representing undecided instructions. In other embodiments, instruction cache 440 includes storage for more or fewer entries. In some embodiments, instruction-related data elements representing undecoded instructions are provided to the prefetch buffers 430 and 450 for subsequent decoding by decode clusters 432 and 452, respectively, from instruction cache 440.

In this example, data elements including branch-related information about undecoded instructions to be decoded by front end 410 are provided to the prefetch buffers 430 and 450 from branch prediction queues 424 and 426 for use in subsequent decoding operations to be performed by decode cluster 432 and 452, respectively.

In one embodiment, branch predictor 420 includes hardware circuitry or logic to determine the data elements to be included in branch prediction queue 424 and branch prediction queue 426. In one embodiment, this information is used to determine which data elements in instruction cache 440 are to be directed to prefetch buffer 430 and which data elements in instruction cache 440 are to be directed to prefetch buffer 450. In some embodiments, front end 410 includes hardware circuitry or logic to determine which subsets of the data elements in instruction cache 440 are to be directed to each of the prefetch buffers 430 and 450. In one example, data elements are directed from instruction cache 440 to one of the prefetch buffers 430 or 450 until one of the data elements in instruction cache 440 corresponds to an entry in the corresponding branch predictor queue 424 or 426 indicating a predicted taken branch.

Front end 410 includes a microcode ROM (shown as uROM 444) that stores data elements representing micro-operations (uops) for performing various ones of the instructions received in the input instruction stream. In some embodiments, each of the decode clusters 432 and 452 includes hardware circuitry or logic to decode multiple ones of the data elements in its prefetch buffer in parallel. For example, the first decode cluster, shown as decode cluster 432, is a two-wide decode cluster includes two decoders, each of which can decode a different data element at substantially the same time. Decode cluster 432 decodes the data elements that were directed to prefetch buffer 430. In some cases, the decoding operation includes generating one or more uops for each decoded data element. In other cases, the decoding operation includes obtaining one or more uops for each decoded data element from uROM 444, e.g., if a result of a previous decoding operation for the same instruction is available in uROM 444. Similarly, the second decode cluster, shown as decode cluster 452, is a two-wide decode cluster includes two decoders, each of which can decode a different data element at substantially the same time. Decode cluster 452 decodes the data elements that were directed to prefetch buffer 450. In some cases, the decoding operation includes generating one or more uops for each decoded data element. In other cases, the decoding operation includes obtaining one or more uops for each decoded data element from uROM 444, e.g., if a result of a previous decoding operation for the same instruction is available in uROM 444.

Front end 410 includes a queue 434 into which the outputs of decode cluster 432 are directed and a queue 454 into which the outputs of decode cluster 452 are directed. In this example, queues 434 and 454 store decoded instructions in the form of micro-operations (uops). In some embodiments, the decoding of each of the data elements of prefetch buffer 430 that are directed to decode cluster 432 generates a single uop in queue 434. In other embodiments, for at least some of the data elements that are directed to decode cluster 432, the decoding generates two or more uops in queue 434. Similarly, in some embodiments the decoding of each of the data elements of prefetch buffer 450 that are directed to decode cluster 452 generates a single uop in queue 454. In other embodiments, for at least some of the data elements that are directed to decode cluster 452, the decoding generates two or more uops in queue 454. As illustrated this example, as a result of a decoding operation, uops are directed to queues 434 and/or 454 from the decode clusters 432 and/or 452 themselves, or from uROM 444, depending on whether or not a result of a previous decoding operation for the same instruction is available in uROM 444.

Front end 410 also includes a merging component 470. Merging component 470 includes hardware circuitry or logic to merge the outputs of decode cluster 432 and decode cluster 452 in queues 434 and 454, respectively, to produce an ordered sequence of decoded instructions. Following the merging of the outputs of decode cluster 432 and decode cluster 452, the order of the decoded instructions in the sequence of decoded instructions reflects the program order of the corresponding undecoded instructions that were directed to the decode clusters through their respective prefetch buffers. In this example, the in-order sequence of decoded instructions generated by merging component 470 is provided to an allocation and register renaming stage of a processor core back end 480 that also includes one or more execution units to execute the instructions.

In some embodiments, splitter circuitry in the front end of the processor operates to being directing data elements representing undecoded instructions to one of the decode clusters (or a queue that feeds the decode cluster) until a trigger condition indicating that the splitter should begin directing data elements to a different decode cluster (or queue that feeds the other decode cluster). In at least some embodiments, groups of data elements that are directed to one of the clusters include contiguous data elements in program order beginning and ending at known instruction boundaries. Some processor ISAs include variable-length instructions, in which it is not easy to determine such boundaries. In one embodiment, the cluster switching trigger condition includes detecting a predicted taken branch. In another embodiment, detecting the cluster switching trigger condition includes detecting a particularly long instruction (e.g., one that is represented by a large number of data elements in the instruction stream). This condition triggers a switch to another decode cluster immediately before or after the data elements for the long instruction are directed to one of the decode clusters. In some ISAs, it is guaranteed that the instruction stream includes an instruction boundary at least as often as a predetermined number of data elements has been received in the instruction stream. For example, in one ISA, an instruction boundary is guaranteed in the instruction stream at least after every 32 bytes in the instruction stream. In this example, detecting the cluster switching trigger condition includes counting the number of bytes that are directed to each decode cluster and switching to another decode cluster each time 32 bytes, or a multiple of 32 bytes, has been directed to one of the decode clusters. In still other embodiments, other mechanisms are used to identify instruction boundaries or other known good points in the instruction stream at which to switch to a different decode cluster. For example, in one embodiment, the data elements that represent undecoded instructions are tagged with encoding indicating whether or not they are candidates for a cluster switching point by instruction pointer generation logic in the front end of the processor, and detecting the cluster switching trigger condition includes detecting an encoding identifying the data element as a candidate for a cluster switching point.

In various embodiments, the systems and methods described above for performing out-of-order clustered decoding address issues in performance, frequency, and scalability. However, in embodiments in which the workload is not well balanced between the decode clusters, the performance of these systems falls short of expectations. For example, systems that implement out-of-order clustered decoding are prone to experience latency asymmetry. While the average performance of these systems is acceptable in most cases, the performance of the systems due to a lack of load balancing for the clustered decoders under particular workloads is more pronounced. In at least some embodiments, load balancing implemented at the point of instruction pointer (IP) generation helps out-of-order clustered decoding implementations maximize the up-time of the decode hardware and the effective bandwidth of the clustered front end. In at least some embodiments, the load balancing mechanisms described herein for out-of-order clustered decoding are implemented fully or partially in hardware circuitry or logic in the processor front end.

In various embodiments, different types of hardware circuitry or logic are implemented for load balancing in out-of-order clustered decoding. For example, in some embodiments, cluster balancing circuitry augments existing branch target buffer (BTB) entries for predicted taken branches with extra meta-data data to force or increase decode parallelism. In some embodiments, the cluster balancing circuitry inserts entries representing "fake predicted taken branches" and augments these entries with meta data to force or increase decode parallelism.

In some embodiments, it is important to track the absolute or relative ages of the blocks of instructions that are decoded by the different decode clusters for the use of any hardware circuitry or logic in the processor that relies on the instructions on which it operated being in program order. This includes, but is not limited to, hardware circuitry or logic to perform the re-ordering of the out-of-order stream of decoded instructions prior to in-order allocation and rename. In some embodiments, given that taken macro branches can no longer be used to implicitly track the age of each block of instructions, the block dispatcher in the IP generator passes state associated with the explicit toggle points (i.e., the points at which a switch is made in the decode cluster to which instruction pointer values representing undecoded instruction are directed) regardless of the mechanism employed to determine when and whether to switch clusters. In some embodiments, this state information, rather than taken branch information, is used further downstream in the execution pipeline to track block age.

As illustrated in this example embodiment, the inputs to IP generator 460, or to cluster balancer 462 thereof, include information obtained from branch predictor 420, such as one or more branch target buffer entries. Although some embodiments are not limited in this regard, the inputs to IP generator 460, or to cluster balancer 462 thereof, also include feedback 475 from back end 480. This feedback includes, for example, an indication of the execution latency of individual blocks of instructions decoded by decode cluster 432 or decode cluster 452. The inputs to IP generator 460, or to cluster balancer 462 thereof, also include feedback from decoded instructions queues 434 and 454, shown as feedback 435 and 455, respectively. This feedback includes, for example, the occupancy level of the queue, the rate at which the queue is filled, the rate at which the queue is drained, or a count of the number of uops provided to back end 480 from the queue for individual blocks of instructions decoded by the corresponding decode cluster, in different embodiments. The count of the number of uops provided to back end 480 from the queue for each individual block of instructions is reflected in the value of the respective counter in the decoded instructions queues 434 and 454 (shown as counters 436 and 456, respectively).

The inputs to IP generator 460, or to cluster balancer 462 thereof, also include feedback from prefetch buffers 430 and 450, shown as feedback 433 and 453, respectively. This feedback includes, for example, the occupancy level of the queue, the rate at which the queue is filled, or the rate at which the queue is drained, in different embodiments. In some embodiments, the inputs to IP generator 460, or to cluster balancer 462 thereof, include feedback from branch prediction queues 424 and 426 (not shown in FIG. 4). This feedback includes, for example, the occupancy level of the queue, the rate at which the queue is filled, or the rate at which the queue is drained, in different embodiments. In some embodiments, the inputs to IP generator 460, or to cluster balancer 462 thereof, also include feedback from decode clusters 432 and 452 (not shown in FIG. 4). This feedback includes, for example, an indication of the decode latency for a block of instructions, in some embodiments. In various embodiments, the feedback received from back end 480 or from any of the other components of front end 410 is used to inform cluster balancing decisions—e.g., to update a predicted branch target address using any of various operations adapted (for example) from conventional branch prediction techniques.

As illustrated in this example embodiment, IP generator 460 is coupled to instruction cache 440 and/or to instruction TLB 442, and obtains information from one or both of these component of front end 410 that is used to inform cluster balancing decisions, as described herein. In some embodiments, branch predictor 420 is coupled to instruction cache 440 and/or to instruction TLB 442 and exchanges information with one or both of these components to inform branch predictions.

In a cluster balancing approach according to some embodiments, circuitry is provided at or near the end of multiple decode pipelines to track the number of uops delivered from a corresponding decode cluster to the back end, or to an execution cluster thereof, per assigned block. By way of illustration and not limitation, one or each of decoded instructions queues 434 and 454 includes or is otherwise coupled to respective counter circuitry (such as the illustrative counters 436, 456 shown). In one such embodiment, a given one of counters 436, 456 comprises a 5-bit counter whose value reflects the number of uops delivered per block—e.g., when the number of delivered uops is less than 32. In this example embodiment, blocks from which 32 uops or more are delivered to the core are assigned a value of 0x0. The value of this counter is sent—e.g., along with information about taken branches for the block—and a corresponding entry in the BTB 422 is updated if the value varies from the previous count value by predetermined amount (e.g., a programmable threshold amount). Under this approach, uop count information is sent from the BTB 422 down the decode pipeline in order to suppress unnecessary updates to the BTB 422. In this example, count values annotated into entries in the BTB 422 have an initial value of 0x0.

In this example embodiment, when and if the number of uops delivered within a block exceeds a threshold value (e.g., a threshold value that is less than 32 and is programmable), a "fake" taken branch is inserted into the BTB 422. This fake branch is given a branch type encoding within the BTB 422 that is unique to fake branches so as to not trigger bogus branch behavior. Here, the term "bogus branch" refers to a predicted taken branch on a non-branch, which typically occurs due to alias issues in a BTB. When bogus branches are detected, the prediction in such a BTB is invalidated. By contrast, a "fake branch" indication is passed down the decode pipeline, where the fake branch entry in the BTB 422 includes as the target address the next sequential instruction pointer—e.g., where, in some embodiments, the fake branch entry is further annotated with the final uop count (or with a value of 0x0 if the final uop count exceeds 32). In some embodiments—e.g., unlike in an entry for a normal ("real") predicted taken branch—the allocation point for a fake branch is prior to instruction execution (e.g., at the branch address calculation point, in some embodiments). In some embodiments, in a variation of this cluster balancing approach, fake branch insertion is restricted to blocks that hit in the instruction cache.

In some embodiments, by employing fake branches when balancing workloads that include long basic blocks (and microcode flows)—e.g., in combination with employing another field in the BTB 422 to annotate block latency—the dispatcher with the IP generator may rely entirely on the BTB 422 to provide information needed to perform cluster load balancing with near optimal balancing.

While consuming entries within BTB 422 for cluster balancing purposes can, when considered in isolation, negatively affect performance, there is very little impact on performance for workloads with long basic blocks due to their pressure on BTB 422 being lower than is typical. For example, systems that include large processors often employ out-of-order clustered decoding in order to keep the execution core(s) fed. Systems that include this class of processors typically include a BTB that is close to the size of the instruction cache. For example, such a BTB includes on the order of 2 k entries. In such systems, the addition of a few bits per entry has relatively small impact in terms of area or performance.

In various embodiments, branch predictor 420 corresponds functionally to branch prediction unit 335—e.g., wherein branch predictor 420 provides the functionality of some or all of detector circuitry 180, search circuitry 182, registration circuitry 184, and evaluation circuitry 186. For example, for some or all entries of BTB 422, each such entry comprise a respective DPES parameter associated with the corresponding (real or fake) branch instruction which is represented by said entry. In one such embodiment, branch predictor 420 comprises circuitry to variously determine the respective values of some or all such DPES parameters. Additionally or alternatively, branch predictor 420 comprises circuitry to evaluate one or more such DPES parameters to determine whether any one or more instruction predictions are to be communicated—e.g., each to a respective one of branch prediction queues 424, 426—in a given fetch cycle.

FIG. 5 shows features of a branch target buffer (BTB) 500 to provide metadata identifying a DPES parameter according to an embodiment. In various embodiments, BTB 500 provides functionality such as that of BTB and ILTB 120, BTB 331, or BTB 422 (for example)—e.g., wherein operations 201 provide a DPES parameter of BTB 500 and/or operations 202 are performed based on BTB 500.

As shown in FIG. 5, BTB 500 comprises entries which are annotated with information usable to trigger a load balancing action between decode clusters, according to some embodiments. In this example, branch target buffer 500 is configured to store information about real and fake predicted taken branches. Branch target buffer 500 includes at least the four entries shown in detail in FIG. 5. In this example, a first field of each entry (in column 510) stores data representing address information—e.g., including the branch instruction address shown, or—alternatively—a tag value, index value, and offset value based on such a branch instruction address—which is used to access the entry. Another field of each entry (in column 520) stores data representing a predicted target address for the branch instruction whose address is represented by the data in the first field of the entry. In the case of entries corresponding to fake predicted branches, such as the entries corresponding to branch address C and branch address E in FIG. 5, the data stored in column 520 represents the address of the next instruction in program order, rather than a predicted branch address.

A third field in each entry (in column 530) is configured to store data representing one or more other tags associated with the corresponding predicted taken branch, in different embodiments. In the example illustrated in FIG. 5, this field stores data indicating whether the corresponding entry represents an actual predicted taken branch (shown as "REAL") or a fake predicted taken branch (shown as "FAKE").

A fourth field in each entry (in column 540) is configured to store data representing a double prediction eligibility state (DPES) for the corresponding instruction which is represented by said entry. For a given entry, the DPES parameter of said entry is to indicate one of a respective double prediction eligibility (DPE) or a respective single prediction only eligibility (SPO). For example, a DPE comprises a respective eligibility of a prediction, based on the instruction which corresponds to the BTB entry in question, to be provided in a same fetch cycle with another prediction based on another instruction. By contrast, a SPO comprises a respective eligibility of a prediction, based on the corresponding instruction, to be provided only as the sole prediction which is communicated in a given fetch cycle.

In general, the entries in a branch target buffer, such as branch target buffer 500, are annotated with any type of information usable to determine where in an instruction sequence a switch between decoder clusters is to take place. In various embodiments, each entry in branch target buffer 500 includes more, fewer, or different fields than those illustrated in FIG. 5. In some embodiments, different numbers of fields are populated within different entries in target buffer 500. For example, some fields may not be applicable for certain branch instruction encodings. In some embodiments, the types of information that is included in each entry of a branch target buffer such as branch target buffer 500 include numerical data representing uop counts, latency values, instruction cache misses, instruction TLB misses, or any other information that is indicative of an imbalanced workload between multiple decode clusters. In some embodiments, the data in one or more fields represents weighting values calculated by the cluster balancer, IP generator, or branch predictor based on a heuristic that is a function of two or more pieces of information obtained from downstream components of the execution pipeline, the branch predicator, the instruction cache, the instruction TLB, or elsewhere. These weighting values are then compared to one or more threshold weighting values to determine how particular load balancing actions are to take place.

Figure 6A:
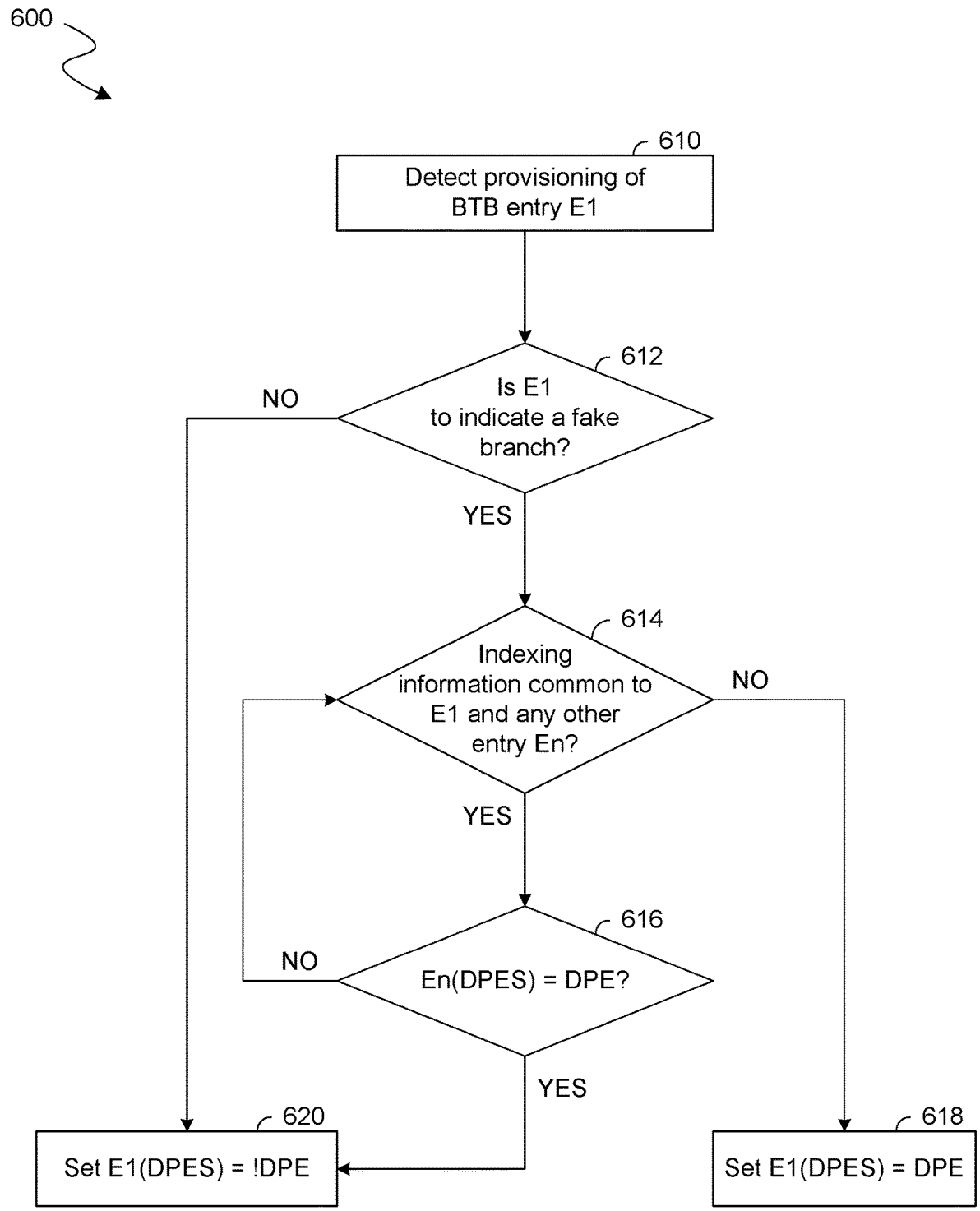
FIG. 6A is a flow diagram illustrating a method to determine metadata of a branch target buffer according to an embodiment.

FIG. 6A shows features of a method 600 to provide a DPES parameter of a BTB entry according to an embodiment. Method 600 is one example of an embodiment which assures that, for a given fetch region under consideration, only one fake branch instruction in said fetch region is designated as double predict eligible. Method 600 is performed (for example) with detector circuitry 180, search circuitry 182, and registration circuitry 184, and/or other suitable circuitry—e.g., wherein operations 201 include, or are otherwise based on, method 600

As shown in FIG. 6A, method 600 comprises (at 610) detecting the provisioning of an entry E1 with a BTB, wherein entry E1 corresponds to a first instruction. Method 600 further comprises performing an evaluation (at 612) to determine whether entry E1 is to correspond to an instruction which belongs to a fake branch instruction type. In an embodiment, the detecting at 610 and the performing at 612 includes one or more operations which (for example) are adapted from conventional techniques to generate a BTB entry—e.g., to represent in the BTB one of a real branch instruction or a fake branch instruction.

Where it is determined at 612 that entry E1 is to correspond to a real branch instruction, rather than a fake branch instruction, method 600 (at 620) sets the double prediction eligibility state (DPES) field of entry E1 to indicate only single prediction eligibility (and not double prediction eligibility). Where it is instead determined at 612 that entry E1 is to correspond to a fake branch instruction, method 600 performs another evaluation (at 614) to determine whether some sufficient type of indexing information is to be used in common for both the addressing of entry E1 and the addressing of at least one other entry (represented as entry En) in the BTB. In one such embodiment, the BTB is a set associative BTB, wherein such common indexing information comprises both a tag term, to search for a particular set of the BTB, and an index term to search for one or more ways of said particular set.

Where it is determined at 614 that there is no other BTB entry En for which some minimum addressing information is common with entry E1, method 600 (at 618) sets the DPES field of entry E1 to indicate double prediction eligibility. Where it is instead determined at 614 that there remains at least one next BTB entry En for which some minimum addressing information is common with entry E1, method 600 determines (at 616) whether, for that current entry En, the respective DPES field thereof indicates double prediction eligibility.

Where it is determined at 616 that the DPES field for the current En under consideration indicates double prediction eligibility, method 600 (at 620) sets the DPES field of entry E1 to indicate only single prediction eligibility (and not double prediction eligibility). Where it is instead determined at 616 that the DPES field for the current entry En indicates only single prediction eligibility, method 600 performs another evaluation (at 614) to detect for any next entry En that might have sufficient addressing information in common with entry E1.

Figure 6B:
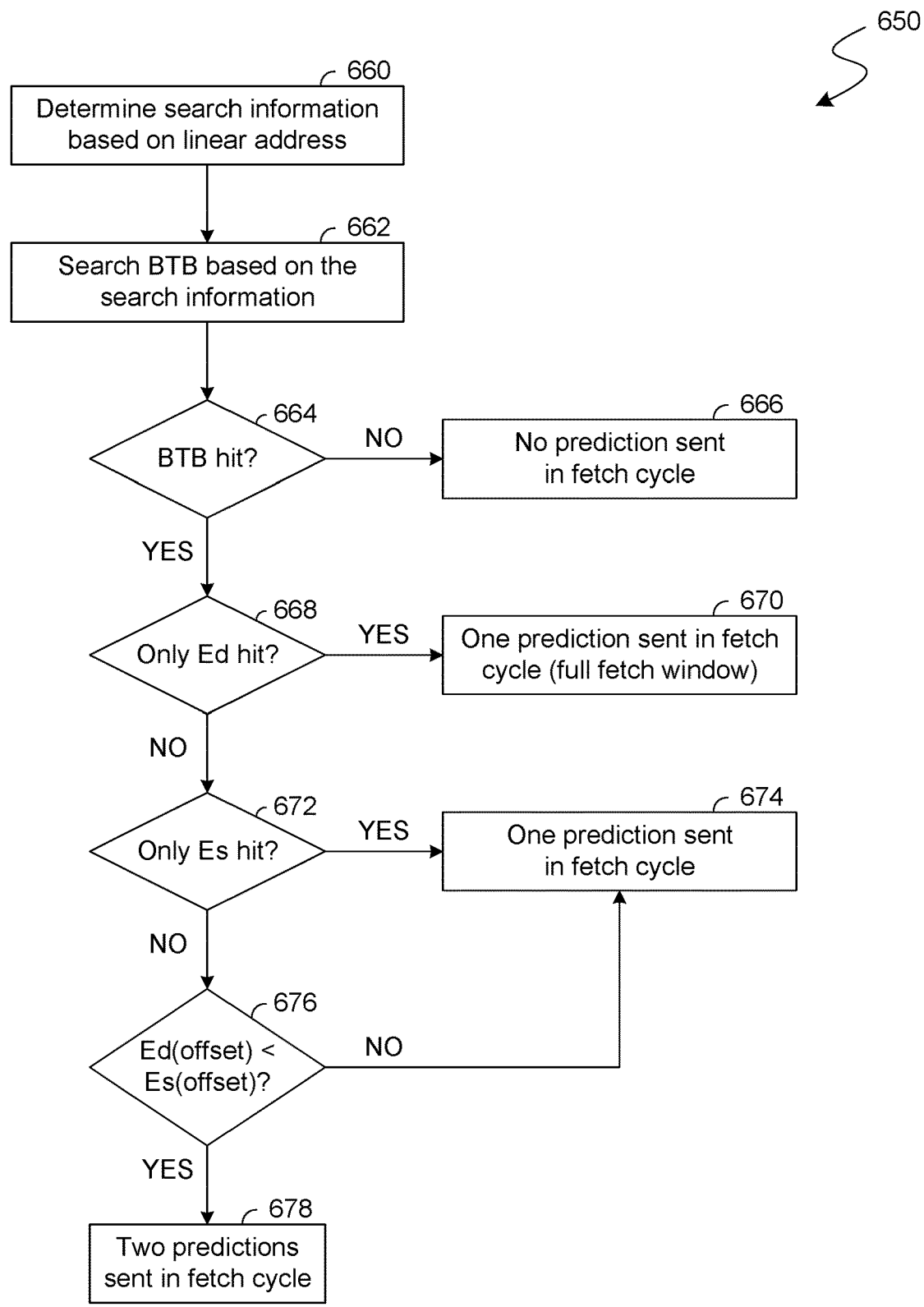
FIG. 6B is a flow diagram illustrating a method to evaluate metadata of a branch target buffer according to an embodiment.

FIG. 6B shows features of a method 650 to provision one or more predictions during a single fetch cycle according to an embodiment. Method 650 illustrates one example of an embodiment wherein the number of predictions to be provided is determined based on the respective DPES parameters of one or more BTB entries. For example, method 650 is based on one or more entries of a BTB such as the one which is accessed by method 600—e.g., wherein operations 202 include some or all of method 650.

As shown in FIG. 6B, method 650 comprises (at 660) determining search information based on a linear address which, for example, represents a starting point of a fetch region which is under consideration. By way of illustration and not limitation, the BTB is a set associative BTB, wherein sets of the BTB each correspond to (and are addressed by) a different respective tag term, and wherein ways of one such set each correspond to a different respective combination of an index term and an offset term. In one such embodiment, determining the search information at 660 comprises parsing or otherwise processing the linear address to identify a tag search term, an index search term, and an offset search term.

Method 600 further comprises (at 662) performing a search of the BTB, based on the search information determined at 660, to detect for any branch instructions (real or fake) which are in the fetch region under consideration. Results of the BTB search are then evaluated (e.g., with the illustrative evaluations 664, 668, 672 shown) to determine whether—and if so, how—one or more predictions are to be communicated in a given fetch cycle to facilitate instruction decoding by multiple decode clusters. The particular number, type and relative order of operations 662, 668, 672 is merely illustrative, and not limiting on some embodiments.

By way of illustration and not limitation, method 600 comprises performing an evaluation (at 664) to determine whether any entry of the BTB was hit by the search performed at 662. Where it is determined at 664 that no BTB entry was hit by the search, method 600 (at 666) foregoes sending any prediction in the given fetch cycle—e.g., wherein decode cluster is to receive all instructions of a fetch region which occupies the maximum fetch window supported by the processor. Where it is instead determined at 664 that at least one entry of the BTB was hit by the search, method 600 performs another evaluation (at 668) to determine whether the search hit only an entry Ed which indicates double prediction eligibility for a corresponding fake branch instruction.

Where it is determined at 668 that the search hit only one such entry Ed, method 600 (at 670) communicates an indication of one (and only one) prediction during the given fetch cycle—e.g., wherein a total size of instructions variously fetched to two decode clusters based on the given fetch cycle is equal to the maximum fetch window. Where it is instead determined at 668 that some other entry (e.g., instead of, or in addition to, an entry Ed) was hit by the search, method 600 performs another evaluation (at 672) to determine whether the search hit only an entry Es which indicates single prediction eligibility for a corresponding instruction.

Where it is determined at 672 that only the entry Es was hit by the search at 662, method 600 (at 674) communicates an indication of one (and only one) prediction during the given fetch cycle. For example, where the entry Es represents a real branch instruction, a total size of instructions variously fetched to two decode clusters based on the given fetch cycle is less than the maximum fetch window. By contrast, where the entry Es represents a fake branch instruction (which is only single prediction eligible), such a total size of the fetched instructions is equal to the maximum fetch window.

Where it is instead determined at 672 that the search at 662 hit both an entry Ed and an entry Es, method 600 performs an evaluation (at 676) to determine whether the offset field Ed(offset) of the entry Ed is less than the offset field Es(offset) of the entry Es. Such an evaluation at 676 detects which of the respective instructions represented by entries Ed, Es is earlier in a sequence of instructions. Where it is determined at 676 that Ed(offset) is greater than Es(Offset), method 600 (at 674) communicates an indication of one (and only one) prediction during the given fetch cycle. Where it is instead determined at 676 that Ed(offset) is less than Es(Offset), method 600 (at 678) communicates two predictions during the given fetch cycle.

Figure 7A:
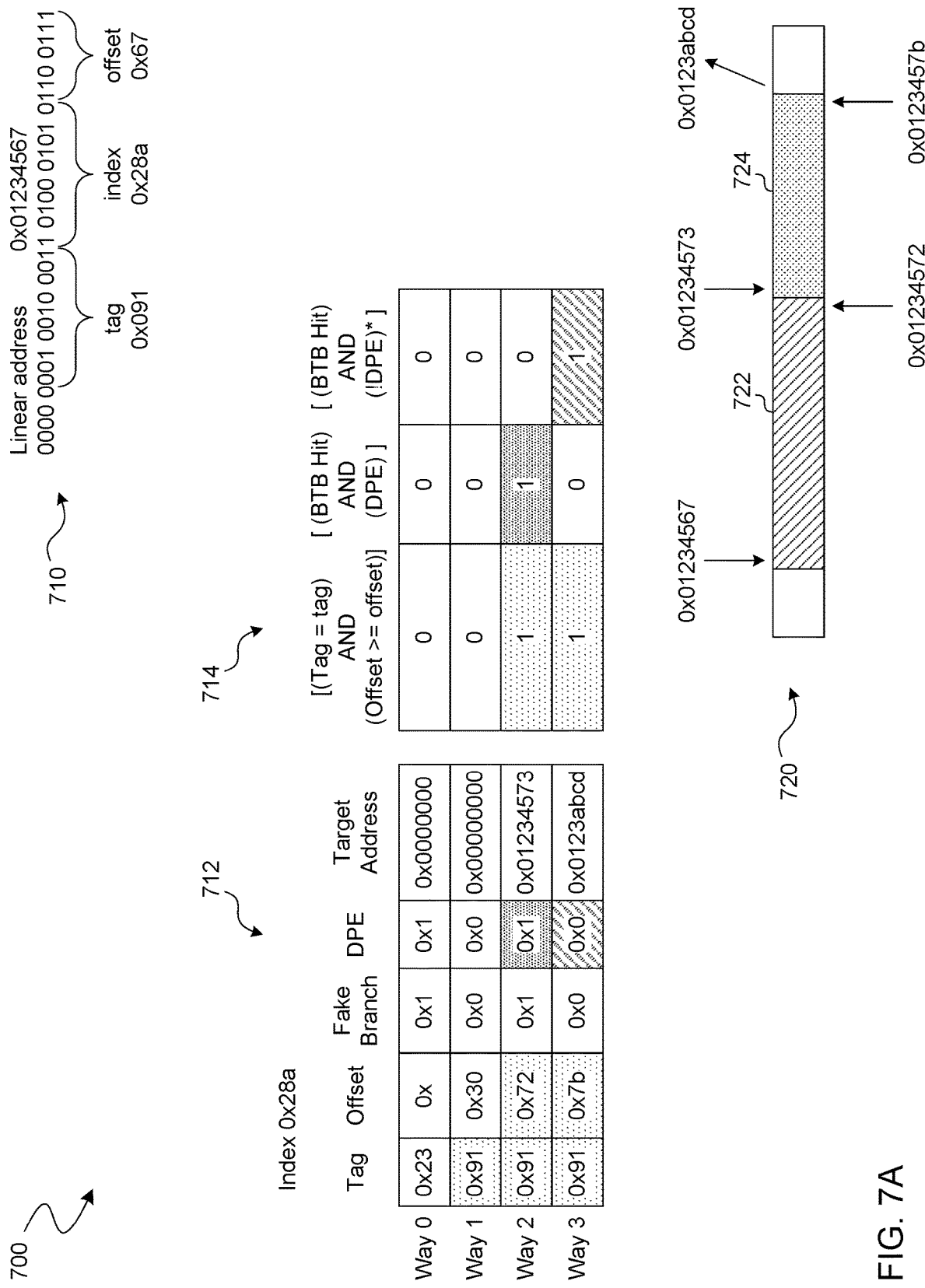
FIGS. 7A, 7B illustrates operations each to facilitate a respective provisioning of a branch prediction according to a corresponding embodiment.

FIG. 7A shows various information 700 which is determined to facilitate the provisioning of predictions to respective branch prediction queues according to an embodiment. For example, some or all of information 700 is determined and/or is a basis for one or more operations of method 200—e.g., wherein information 700 is determined with detector circuitry 180, detector circuitry 181, instruction prefetch stage 330 and/or other suitable resources of a processor front end.

As indicated in FIG. 7A, a processor front end according to one embodiment detects a linear address LA 710 (in this example, equal to 0x01234567) which corresponds to the starting point of a fetch region which is under consideration. In this context, the fetch region is "under consideration" at least insofar as front end resources are operating at the time to determine how a fetching of some or all of the fetch region is to be indicated, in a single fetch cycle, to one or more of multiple instruction decode pipelines. Such operations include, or are otherwise based at least in part on, an identification of one or more branch instructions (real or fake) of the fetch region under consideration. For example, such determining includes accessing a BTB which, in this embodiment, is a set associative BTB comprising sets which, in turn, each comprise respective ways (entries) that each represent a respective instruction.

In the example embodiment shown, LA 710 includes (or is otherwise a basis for determining) a tag term, an index term, and an offset term—e.g., where such determining includes or is otherwise based on the identifying at 210. By way of illustration and not limitation, the illustrative tag term 0x9, index term 0x28a, and offset term 0x67 shown are identified as being equal to (respectively) bits LA[26:17], bits LA[16:7], and bits LA[6:0] of LA 710.

In one such embodiment, index term 0x28a is used as a search term for identifying a corresponding one or more ways of the set associative BTB. Furthermore, the tag term 0x91 corresponds to a particular set of the set associative BTB, an is used as another search term for identifying which way or ways—of the one or more ways corresponding to index term 0x28a—are in the corresponding set. Further still, the offset term 0x67 is used to detect which way or ways (if any), of the one or more ways identified with index term 0x28a and tag term 0x91, are in the fetch region under consideration. More particularly, the one or more ways are further evaluated to identify any way or ways which each have a respective offset greater than offset term 0x67.

In the example scenario illustrated by FIG. 7A, information 710 includes results 712 of a search of the BTB based on index term 0x28a. Of the four ways 0-3 returned in results 712, ways 1 and 2 represent real branch instructions, while ways 0 and 2 represent fake branch instructions (which are both identified as double predict eligible). The ways identified by results 712 are then further evaluated—based on tag term 0x91 and offset term 0x67—to generate the additional results 714 shown. As shown in the leftmost column of results 714, only ways 2 and 3 are "hit" by the three-term search of the BTB—i.e., wherein, of the ways 0-3 which each correspond to index term 0x28a, only ways 1-3 further correspond to tag term 0x91, of which only ways 2 and 3 have respective offsets greater than the offset term 0x67.

In some embodiments, the provisioning of a double prediction in a single fetch cycle is performed based on a determination that the fetch region under consideration has multiple branch instructions, and that the earliest of said branch instructions (earliest in a sequence of instructions) is classified as double prediction eligible. By contrast, only one prediction is to be provided in a single fetch cycle where it is determined that the earliest of said branch instructions is classified as being only single prediction eligible. Alternatively or in addition, only one prediction is to be provided in a single fetch cycle where it is determined that the fetch region under consideration has one branch instruction, but not any other branch instruction.

For example, the middle column of results 714 represents a first hit vector which indicates any way which has been hit by the BTB search, and which also represents an instruction which is double predict eligible. By contrast, the rightmost column of results 714 represents a second hit vector which indicates a way which has been hit by the BTB search, and which also represents an instruction which is not double predict eligible. As indicated by the asterisk notation shown, this second hit vector, in some embodiments, is limited to indicating a maximum of only one such BTB entry—e.g., that which has the smallest offset value of all such "hit, but not DPE" entries.

In one such embodiment, an evaluation is performed to determine whether the first hit vector and the second hit vector in results 714 each indicate a respective BTB entry and—if so—to determine whether the earliest instruction represented by said entries (earliest as indicated by respective offset values) is classified as double prediction eligible. In the illustrative scenario shown by information 700, way 2 represents a fake branch instruction which is designated as double predict eligible, and which is earlier than the instruction represented by way 3. Accordingly, double prediction is permitted, and the actual fetch region 720, which is to be indicated in a single fetch cycle, comprises portions 722, 724 which are to be fetched to different respective branch prediction queues.

More particularly, portion 722 extends from the LA 710 (0x01234567) to the address (0x01234572) of the fake branch instruction represented by way 2. By contrast, portion 724 extends from the target address (0x01234573) of the fake branch instruction represented by way 2, to the address (0x0123457b) of the real branch instruction indicated by way 3. In one such embodiment, the target address (0x0123abcd) of the real branch instruction indicated by way 3 is to be the linear address of the start of a next fetch region to be under consideration. In one such embodiment, portions 722, 724 are fetched to different respective branch prediction queues, where such fetching begins in the same fetch cycle.

Figure 7B:
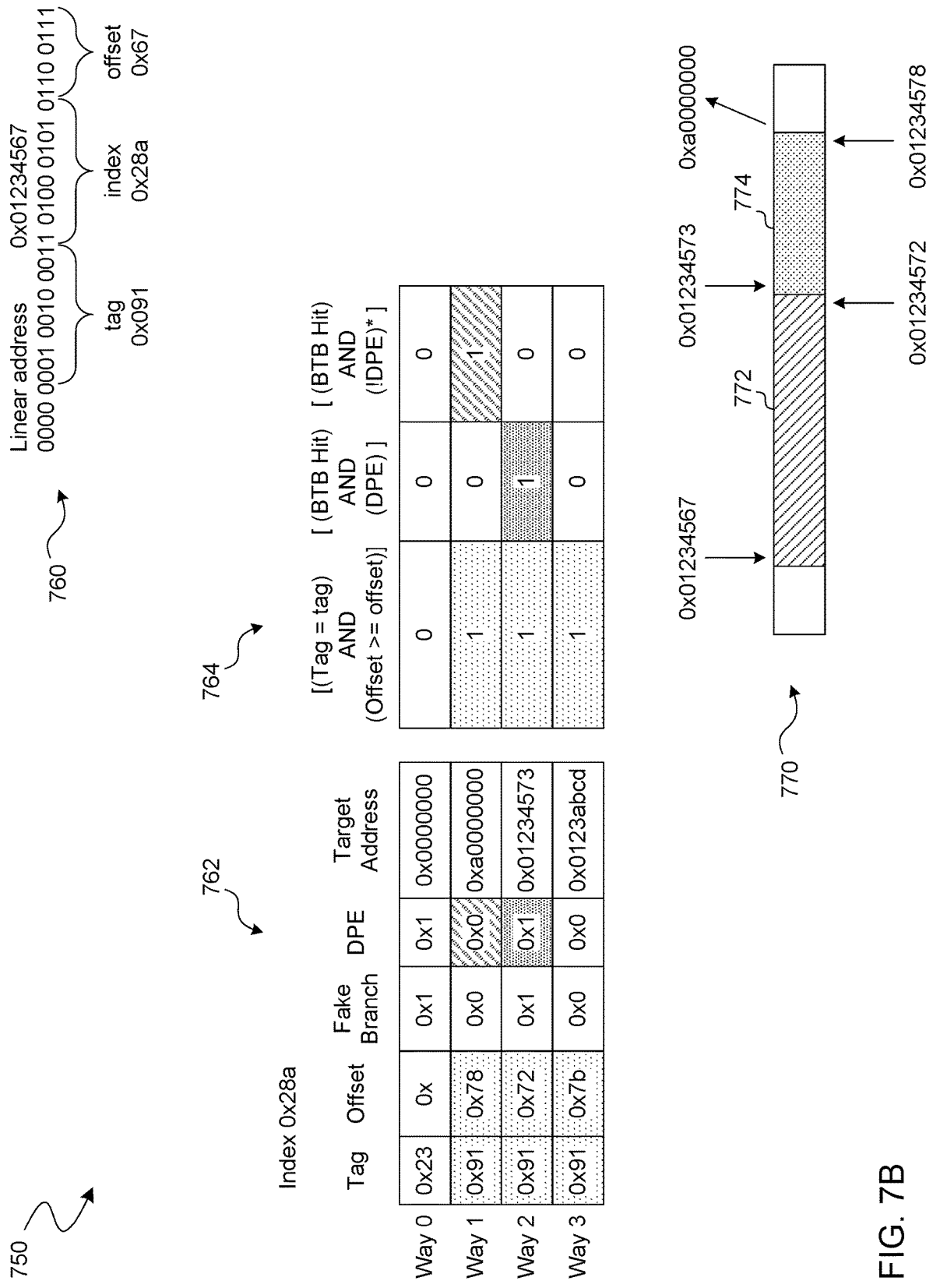

FIG. 7B shows other information 750 which facilitates the provisioning of predictions to respective branch prediction queues according to a different embodiment. Information 750 illustrates an alternative scenario to that shown in FIG. 7A.

More particularly, a processor front end in said scenario detects a linear address LA 760 of a fetch region which is under consideration (where LA 760 is also equal to 0x01234567), and identifies the same tag term 0x9, index term 0x28a, and offset term 0x67 based on LA 760. Based on the index term 0x28a, a search of a set associative BTB is performed, resulting in the search results 762 shown. The four ways 0-3 identified by results 762 are then further evaluated—based on tag term 0x91 and offset term 0x67— to generate the additional results 764 shown.

As indicated by the leftmost column of results 764, ways 1, 2 and 3 are hit by the three-term search of the BTB. The middle column of results 764 represents a first hit vector which indicates any way which has been hit by the BTB search, and which also represents an instruction which is double predict eligible. The rightmost column of results 764 represents a second hit vector which indicates a way which has been hit by the BTB search, and which also represents an instruction which is not double predict eligible (and which has the smallest offset value).

In the illustrative scenario shown by information 750, way 2 represents a fake branch instruction which is designated as double predict eligible, and which is earlier than the instruction represented by way 1. Accordingly, double prediction is permitted, and the actual fetch region 770, which is to be indicated in a single fetch cycle, comprises portions 772, 774 which are to be fetched to different respective branch prediction queues.

More particularly, portion 772 extends from the LA 760 (0x01234567) to the address (0x01234572) of the fake branch instruction represented by way 2. By contrast, portion 774 extends from the target address (0x01234573) of the fake branch instruction represented by way 2, to the address (0x01234578) of the real branch instruction indicated by way 1. In one such embodiment, the target address (0xa000000) of the real branch instruction indicated by way 1 is to be the linear address of the start of a next fetch region to be under consideration. In one such embodiment, portions 772, 774 are fetched to different respective branch prediction queues, where such fetching begins in the same fetch cycle.

FIG. 8A-8F variously shows respective data structures to facilitate a provisioning of decoded instructions with multiple decode clusters according to an embodiment. Such data structures illustrate one example of an application of out-of-order clustered decoding—e.g., wherein one or more operations of method 200 are based on and/or determine information to be provided with some or all such data structures.

More specifically, FIG. 8A illustrates a queue 810, within a processor, of data elements representing a sequence of undecoded instructions in program order. In this example, queue 810 (which, for example, corresponds functionally to instruction cache 440) includes a first sequence of related data elements A0-A5. In one embodiment, these data elements collectively represent a single instruction. In another embodiment, these data elements collectively represent a sequence of two or more instructions in program order. The data elements A0 and A5, in this example, represent instruction boundaries in a sequence of instructions. For example, data element A0 is the first data element associated with an instruction and data element A5 is the last data element associated with an instruction (either the same instruction or a different instruction than the instruction with which data element A0 is associated). In this example, data element A5 represents a predicted taken branch instruction or an instruction pointer value identifying a predicted taken branch.

In this example, queue 810 includes a second sequence of related data elements B0-B4. In one embodiment, these data elements collectively represent a single instruction. In another embodiment, these data elements collectively represent a sequence of two or more instructions in program order. The data elements B0 and B3, in this example, represent instruction boundaries in a sequence of instructions. For example, data element B0 is the first data element associated with an instruction and data element B3 is the last data element associated with an instruction (either the same instruction or a different instruction than the instruction with which data element B0 is associated). In this example, data element B4 represents a fake predicted taken branch instruction or an instruction pointer value representing a fake predicted taken branch that was inserted following the instruction boundary at data element B3 based on the application of a cluster load balancing mechanism such as any of those described herein.

In this example, queue 810 includes a third sequence of related data elements C0-C3. In one embodiment, these data elements collectively represent a single instruction. In another embodiment, these data elements collectively represent a sequence of two or more instructions in program order. The data elements C0 and C3, in this example, represent instruction boundaries in a sequence of instructions. For example, data element C0 is the first data element associated with an instruction and data element C3 is the last data element associated with an instruction (either the same instruction or a different instruction than the instruction with which data element C0 is associated). In this example, none of the data elements C0-C3 represents a real or fake predicted taken branch instruction nor an instruction pointer value representing a real or fake predicted taken branch, nor are any of data elements C0-C3 associated with any other trigger condition or indication that a cluster switch should be performed or suppressed following its execution.

In this example, queue 810 includes a fourth sequence of related data elements D0-D3. In one embodiment, these data elements collectively represent a single instruction. In another embodiment, these data elements collectively represent a sequence of two or more instructions in program order. The data elements D0 and D3, in this example, represent instruction boundaries in a sequence of instructions. For example, data element D0 is the first data element associated with an instruction and data element D3 is the last data element associated with an instruction (either the same instruction or a different instruction than the instruction with which data element D0 is associated). Although some embodiments are not limited in this regard, a given data element is subject to being annotated with metadata to indicate a weighting which facilitates load balancing—e.g., wherein data element D3 is annotated with a value indicating a high weighting for the sequence of related data elements D0-D3 with respect to load balancing. For example, this data element, or the block of instructions represented by data elements D0-D3 are associated with a large uop count or a long decode latency, and the annotation reflects this condition.

In this example, queue 810 also includes a fifth sequence of related data elements, a portion of which is illustrated as E0-E2. In one embodiment, these data elements and other data elements not shown collectively represent a single instruction. In another embodiment, these data elements and other elements not shown collectively represent a sequence of two or more instructions in program order. The data element E0, in this example, represents an instruction boundary in a sequence of instructions. For example, data element E0 is the first data element associated with an instruction. Data elements E2 and E3 are associated with the same instruction or are associated with a different instruction than the instruction with which data element E0 is associated). In this example, none of the data elements E0-E2 represents a real or fake predicted taken branch instruction nor an instruction pointer value representing a real or fake predicted taken branch.

In this example, the data elements shown in queue 810 in program order are directed to two decode clusters in the front end of the processor for out-of-order clustered decoding. In another embodiment, a different mechanism and/or a different cluster switching trigger condition is applied by a splitting component, IP generator, or cluster balancer to direct the data elements in queue 810 to the two decode clusters for out-of-order clustered decoding.

FIGS. 8B, 8C illustrate (respectively) a prefetch buffer 820 for a first decode cluster and a prefetch buffer 825 for a second decode cluster, after subsets of the data elements in queue 810 have been directed to these buffers by a splitting component, IP generator, or cluster balancer of the front end of the processor. By way of illustration and not limitation, prefetch buffers 820, 825 provide functionality such as that of prefetch buffers 430, 450. In this example, the splitting component, IP generator, or cluster balancer has directed the first subset of the data elements (shown as A0-A5) to the prefetch buffer 820 for the first decode cluster. Since data element A5 represents a predicted taken branch instruction or an instruction pointer value identifying a predicted taken branch, the splitting component, IP generator, or cluster balancer switched to the second decode cluster. Therefore, the second subset of data elements (shown as B0-B4) was directed to the prefetch buffer 825 for the second decode cluster. Since data element B4 represents a fake predicted taken branch instruction or an instruction pointer value representing a fake predicted taken branch, the splitting component, IP generator, or cluster balancer switched back to the first decode cluster. Therefore, the third subset of data elements (shown as C0-C3) was directed to the prefetch buffer 820 for the first decode cluster. Since data element C3 does not represent a real or fake predicted taken branch instruction nor an instruction pointer value representing a real or fake predicted taken branch, nor is it associated with any other trigger condition or indication that a cluster switch should be performed or suppressed following its execution, the splitting component, IP generator, or cluster balancer did not switch decode clusters, but instead directed the fourth subset of data elements (shown as D0-D3) to the prefetch buffer 820 for the first decode cluster. Finally, since data element D3 has been annotated, in this example embodiment, with a value indicating a high weighting for the sequence of related data elements D0-D3 with respect to load balancing, the splitting component, IP generator, or cluster balancer again switched to the second decode cluster, and at least the portion of the fifth subset of data elements shown as E0-E2 was directed to the prefetch buffer 825 for the second decode cluster.

In this example, the two decode clusters in the processor decode the data elements that have been directed to their respective prefetch buffers (820 and 825) substantially in parallel. In at least some embodiments, the decoded instructions (uops) corresponding to data elements that represent a real or fake predicted taken branch instruction or an instruction pointer value representing a real or fake predicted taken branch (or, in some embodiments, that were annotated with a high weighting values with respect to load balancing) are tagged with an indication of the cluster switch that occurred following their direction to one of the decode clusters. In this example, each of the decoded instructions (uops) associated with data elements A5, B4, and/or D3 are tagged with such an indication. In this example, a toggle bit included in the data element encoding is set (e.g., to a value of "1" or a value representing "true") to indicate that a condition to trigger a switch to another decode cluster was met and that a cluster switch was performed by the splitting component, IP generator, or cluster balancer. In other embodiments, other mechanisms are used to tag various data elements to indicate that a trigger condition for cluster switching was met. In some embodiments, each of the decode clusters includes hardware circuitry or logic to decode multiple ones of the data elements in its prefetch buffer in parallel. For example, each of the decode clusters performs two-wide decoding or n-wide decoding (where n is 3 or more), in different embodiments.

FIGS. 8D, 8E illustrate (respectively) a queue 830 of decoded instructions (uops) output by the first decode cluster for some of the data elements in prefetch buffer 820, and a queue 835 of decoded instructions (uops) output by the second decode cluster for some of the data elements in prefetch buffer 825. By way of illustration and not limitation, decoded instruction queues 830, 835 provide functionality such as that of decoded instruction queues 434, 454. In some embodiments, queues 830 and 835 store decoded instructions (uops) that are received (or retrieved) by a merging component for potential inclusion in an instruction buffer 840, as described below. In this example, because the processor core back end to which decoded instructions are to be provided includes a three-wide allocator/renamer, the merging component, on each cycle, receives (or retrieves) the next three decoded instructions (uops) from each of the prefetch buffers (820 and 825) for possible inclusion in instruction buffer 840.

FIG. 8F illustrates instruction buffer 840, which stores decoded instructions to be presented to the allocator or renaming stage in a processor core back end following the selection and re-ordering of these decoded instructions (uop) by the merging component. In this example, the merging component has identified the first element of queue 830 as containing the next decoded instruction to be executed (shown as the uop corresponding to data element A4) and has added it to instruction buffer 840. Since this element does not include a toggle bit that is set, the merging component adds the second element of queue 830 (shown as the uop corresponding to data element A5) to instruction buffer 840. However, since the second element of queue 830 (shown as the uop corresponding to data element A5) includes a toggle bit that is set, the merging component does not add this element to instruction buffer 840. Instead, the merging element identifies the first unexecuted (decoded) instruction in queue 835 (shown as the uop for data element B0) and adds this element to instruction buffer 840.

In this example, after providing the contents of instruction buffer 840 to the processor core back end, storage for various queues entries is de-allocated, and their pointers advance. Subsequently, the merging component begins assembling the next group of four decoded instructions (uops) in a similar fashion, starting with the decoded instruction (uop) corresponding to data element B1.

The figures described herein detail exemplary architectures and systems to implement embodiments of the above. In some embodiments, one or more hardware components and/or instructions described herein are emulated as detailed below, or implemented as software modules.

Embodiments of the instruction(s) detailed above are embodied may be embodied in a "generic vector friendly instruction format" which is detailed herein. In other embodiments, such a format is not utilized and another instruction format is used, however, the description herein of the writemask registers, various data transformations (swizzle, broadcast, etc.), addressing, etc. is generally applicable to the description of the embodiments of the instruction(s) above. Additionally, exemplary systems, architectures, and pipelines are detailed herein. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed herein. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 9A:
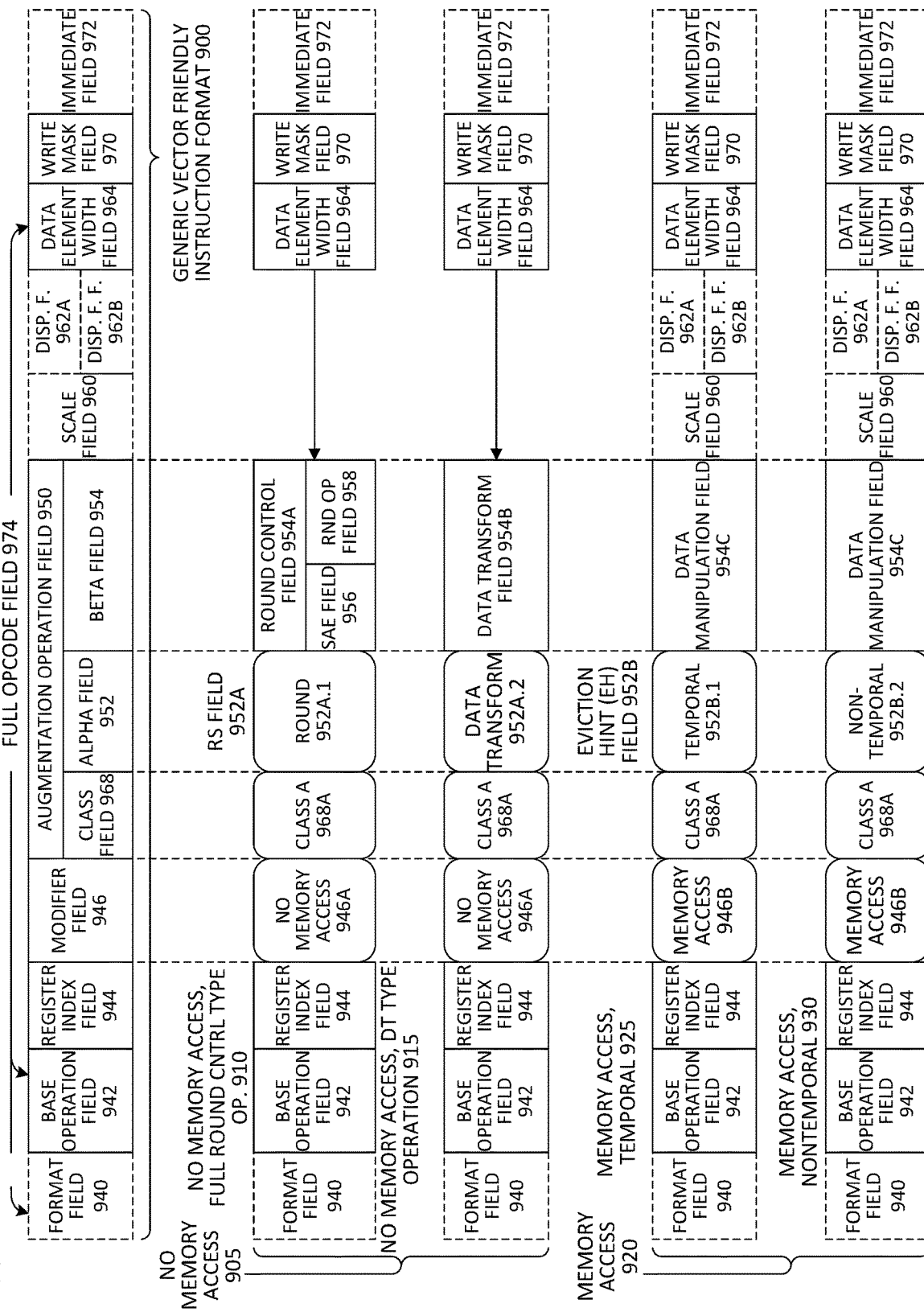
FIGS. 9A through 9B are block diagrams illustrating a generic vector friendly instruction format and instruction templates thereof according to embodiments of the invention.
Figure 9B:
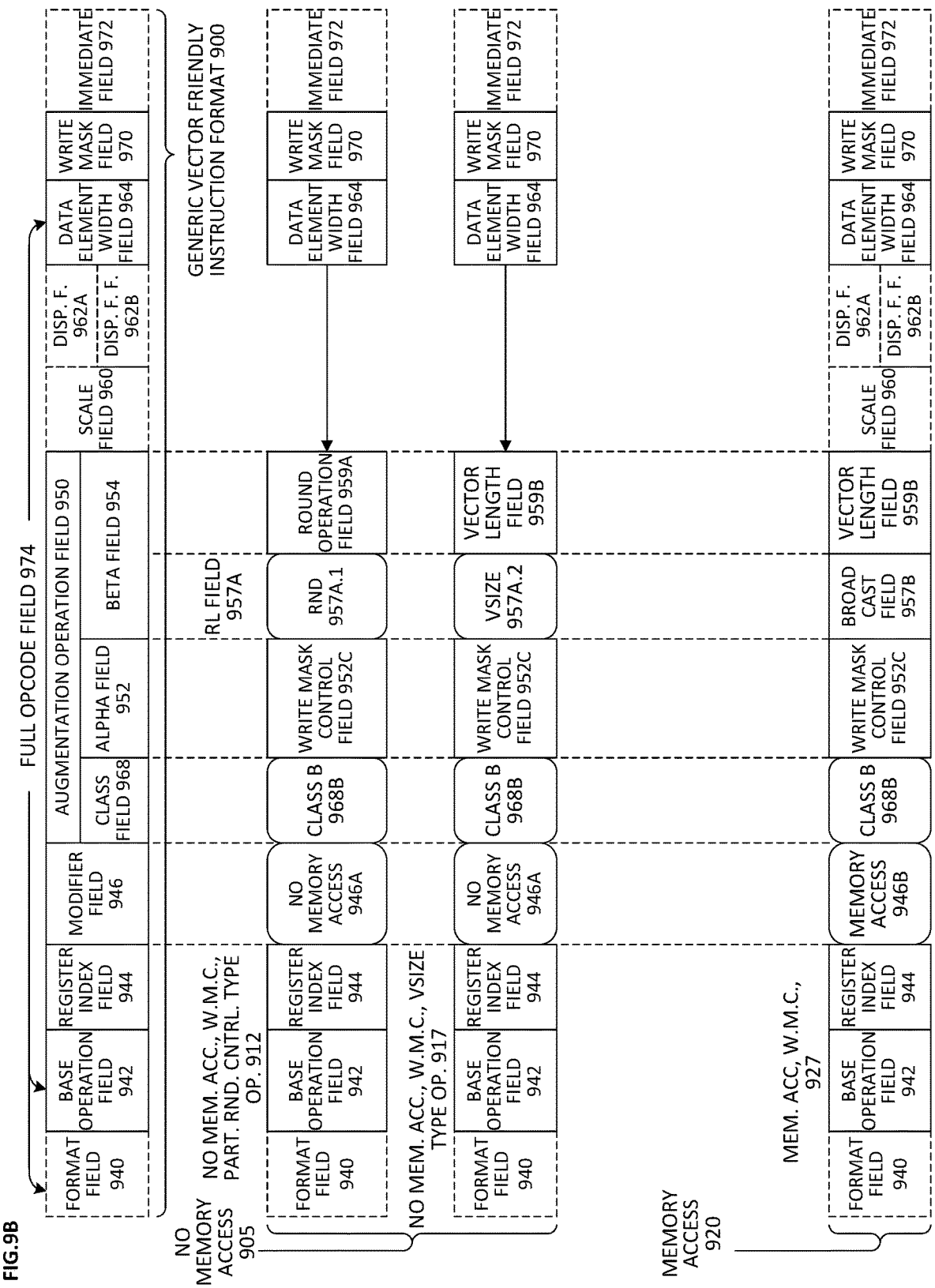

FIGS. 9A through 9B are block diagrams illustrating a generic vector friendly instruction format and instruction templates thereof according to embodiments of the invention. FIG. 9A is a block diagram illustrating a generic vector friendly instruction format and class A instruction templates thereof according to embodiments of the invention; while FIG. 9B is a block diagram illustrating the generic vector friendly instruction format and class B instruction templates thereof according to embodiments of the invention. Specifically, a generic vector friendly instruction format 900 for which are defined class A and class B instruction templates, both of which include no memory access 905 instruction templates and memory access 920 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 9A include: 1) within the no memory access 905 instruction templates there is shown a no memory access, full round control type operation 910 instruction template and a no memory access, data transform type operation 915 instruction template; and 2) within the memory access 920 instruction templates there is shown a memory access, temporal 925 instruction template and a memory access, non-temporal 930 instruction template. The class B instruction templates in FIG. 9B include: 1) within the no memory access 905 instruction templates there is shown a no memory access, write mask control, partial round control type operation 912 instruction template and a no memory access, write mask control, vsize type operation 917 instruction template; and 2) within the memory access 920 instruction templates there is shown a memory access, write mask control 927 instruction template.

The generic vector friendly instruction format 900 includes the following fields listed herein in the order illustrated in FIGS. 9A through 9B.

Format field 940—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 942—its content distinguishes different base operations.

Register index field 944—its content, directly or through address generation, specifies the locations of the source and destination operands, be they in registers or in memory. These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 946—its content distinguishes occurrences of instructions in the generic vector instruction format that specify memory access from those that do not; that is, between no memory access 905 instruction templates and memory access 920 instruction templates (e.g., no memory access 946A and memory access 946B for the class field 946 respectively in FIGS. 9A-B). Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 950—its content distinguishes which one of a variety of different operations to be performed in addition to the base operation. This field is context specific. In one embodiment of the invention, this field is divided into a class field 968, an alpha field 952, and a beta field 954. The augmentation operation field 950 allows common groups of operations to be performed in a single instruction rather than 2, 3, or 4 instructions.

Scale field 960—its content allows for the scaling of the index field's content for memory address generation (e.g., for address generation that uses 2scale*index+base).

Displacement Field 962A— its content is used as part of memory address generation (e.g., for address generation that uses 2scale*index+base+displacement).

Displacement Factor Field 962B (note that the juxtaposition of displacement field 962A directly over displacement factor field 962B indicates one or the other is used)—its content is used as part of address generation; it specifies a displacement factor that is to be scaled by the size of a memory access (N)—where N is the number of bytes in the memory access (e.g., for address generation that uses 2scale*index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 974 (described later herein) and the data manipulation field 954C. The displacement field 962A and the displacement factor field 962B are optional in the sense that they are not used for the no memory access 905 instruction templates and/or different embodiments may implement only one or none of the two.

Data element width field 964—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 970—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 970 allows for partial vector operations, including loads, stores, arithmetic, logical, etc. While embodiments of the invention are described in which the write mask field's 970 content selects one of a number of write mask registers that contains the write mask to be used (and thus the write mask field's 970 content indirectly identifies that masking to be performed), alternative embodiments instead or additional allow the write mask field's 970 content to directly specify the masking to be performed.

Immediate field 972—its content allows for the specification of an immediate. This field is optional in the sense that is it not present in an implementation of the generic vector friendly format that does not support immediate and it is not present in instructions that do not use an immediate.

Class field 968—its content distinguishes between different classes of instructions. With reference to FIGS. 9A-B, the contents of this field select between class A and class B instructions. In FIGS. 9A-B, rounded corner squares are used to indicate a specific value is present in a field (e.g., class A 968A and class B 968B for the class field 968 respectively in FIGS. 9A-B).

Instruction Templates of Class A

In the case of the non-memory access 905 instruction templates of class A, the alpha field 952 is interpreted as an RS field 952A, whose content distinguishes which one of the different augmentation operation types are to be performed (e.g., round 952A.1 and data transform 952A.2 are respectively specified for the no memory access, round type operation 910 and the no memory access, data transform type operation 915 instruction templates), while the beta field 954 distinguishes which of the operations of the specified type is to be performed. In the no memory access 905 instruction templates, the scale field 960, the displacement field 962A, and the displacement scale filed 962B are not present.

No-Memory Access Instruction Templates—Full Round Control Type Operation

In the no memory access full round control type operation 910 instruction template, the beta field 954 is interpreted as a round control field 954A, whose content(s) provide static rounding. While in the described embodiments of the invention the round control field 954A includes a suppress all floating point exceptions (SAE) field 956 and a round operation control field 958, alternative embodiments may support may encode both these concepts into the same field or only have one or the other of these concepts/fields (e.g., may have only the round operation control field 958).

SAE field 956—its content distinguishes whether or not to disable the exception event reporting; when the SAE field's 956 content indicates suppression is enabled, a given instruction does not report any kind of floating-point exception flag and does not raise any floating point exception handler.

Round operation control field 958—its content distinguishes which one of a group of rounding operations to perform (e.g., Round-up, Round-down, Round-towards-zero and Round-to-nearest). Thus, the round operation control field 958 allows for the changing of the rounding mode on a per instruction basis. In one embodiment of the invention where a processor includes a control register for specifying rounding modes, the round operation control field's 958 content overrides that register value.

No Memory Access Instruction Templates—Data Transform Type Operation

In the no memory access data transform type operation 915 instruction template, the beta field 954 is interpreted as a data transform field 954B, whose content distinguishes which one of a number of data transforms is to be performed (e.g., no data transform, swizzle, broadcast).

In the case of a memory access 920 instruction template of class A, the alpha field 952 is interpreted as an eviction hint field 952B, whose content distinguishes which one of the eviction hints is to be used (in FIG. 9A, temporal 952B.1 and non-temporal 952B.2 are respectively specified for the memory access, temporal 925 instruction template and the memory access, non-temporal 930 instruction template), while the beta field 954 is interpreted as a data manipulation field 954C, whose content distinguishes which one of a number of data manipulation operations (also known as primitives) is to be performed (e.g., no manipulation; broadcast; up conversion of a source; and down conversion of a destination). The memory access 920 instruction templates include the scale field 960, and optionally the displacement field 962A or the displacement scale field 962B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 952 is interpreted as a write mask control (Z) field 952C, whose content distinguishes whether the write masking controlled by the write mask field 970 should be a merging or a zeroing.

In the case of the non-memory access 905 instruction templates of class B, part of the beta field 954 is interpreted as an RL field 957A, whose content distinguishes which one of the different augmentation operation types are to be performed (e.g., round 957A.1 and vector length (VSIZE) 957A.2 are respectively specified for the no memory access, write mask control, partial round control type operation 912 instruction template and the no memory access, write mask control, VSIZE type operation 917 instruction template), while the rest of the beta field 954 distinguishes which of the operations of the specified type is to be performed. In the no memory access 905 instruction templates, the scale field 960, the displacement field 962A, and the displacement scale filed 962B are not present.

In the no memory access, write mask control, partial round control type operation 912 instruction template, the rest of the beta field 954 is interpreted as a round operation field 959A and exception event reporting is disabled (a given instruction does not report any kind of floating-point exception flag and does not raise any floating point exception handler).

Round operation control field 959A—just as round operation control field 958, its content distinguishes which one of a group of rounding operations to perform (e.g., Round-up, Round-down, Round-towards-zero and Round-to-nearest). Thus, the round operation control field 959A allows for the changing of the rounding mode on a per instruction basis. In one embodiment of the invention where a processor includes a control register for specifying rounding modes, the round operation control field's 958 content overrides that register value.

In the no memory access, write mask control, VSIZE type operation 917 instruction template, the rest of the beta field 954 is interpreted as a vector length field 959B, whose content distinguishes which one of a number of data vector lengths is to be performed on (e.g., 128, 256, or 512 byte).

In the case of a memory access 920 instruction template of class B, part of the beta field 954 is interpreted as a broadcast field 957B, whose content distinguishes whether or not the broadcast type data manipulation operation is to be performed, while the rest of the beta field 954 is interpreted the vector length field 959B. The memory access 920 instruction templates include the scale field 960, and optionally the displacement field 962A or the displacement scale field 962B.

With regard to the generic vector friendly instruction format 900, a full opcode field 974 is shown including the format field 940, the base operation field 942, and the data element width field 964. While one embodiment is shown where the full opcode field 974 includes all of these fields, the full opcode field 974 includes less than all of these fields in embodiments that do not support all of them. The full opcode field 974 provides the operation code (opcode).

The augmentation operation field 950, the data element width field 964, and the write mask field 970 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 10 is a block diagram illustrating an exemplary specific vector friendly instruction format according to embodiments of the invention. FIG. 10 shows a specific vector friendly instruction format 1000 that is specific in the sense that it specifies the location, size, interpretation, and order of the fields, as well as values for some of those fields. The specific vector friendly instruction format 1000 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 9 into which the fields from FIG. 10 map are illustrated.

It should be understood that, although embodiments of the invention are described with reference to the specific vector friendly instruction format 1000 in the context of the generic vector friendly instruction format 900 for illustrative purposes, the invention is not limited to the specific vector friendly instruction format 1000 except where claimed. For example, the generic vector friendly instruction format 900 contemplates a variety of possible sizes for the various fields, while the specific vector friendly instruction format 1000 is shown as having fields of specific sizes. By way of specific example, while the data element width field 964 is illustrated as a one bit field in the specific vector friendly instruction format 1000, the invention is not so limited (that is, the generic vector friendly instruction format 900 contemplates other sizes of the data element width field 964).

The specific vector friendly instruction format 1000 includes the following fields listed herein in the order illustrated in FIG. 10A.

EVEX Prefix (Bytes 0-3) 1002—is encoded in a four-byte form.

Format Field 940 (EVEX Byte 0, bits [7:0])—the first byte (EVEX Byte 0) is the format field 940 and it contains 0x62 (the unique value used for distinguishing the vector friendly instruction format in one embodiment of the invention).

The second-fourth bytes (EVEX Bytes 1-3) include a number of bit fields providing specific capability.

REX field 1005 (EVEX Byte 1, bits [7-5])—consists of a EVEX.R bit field (EVEX Byte 1, bit [7]—R), EVEX.X bit field (EVEX byte 1, bit [6]—X), and 957BEX byte 1, bit[5]—B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1010—this is the first part of the REX' field 1010 and is the EVEX.R' bit field (EVEX Byte 1, bit [4]—R') that is used to encode either the upper 16 or lower 16 of the extended 32 register set. In one embodiment of the invention, this bit, along with others as indicated herein, is stored in bit inverted format to distinguish (in the well-known x86 32-bit mode) from the BOUND instruction, whose real opcode byte is 62, but does not accept in the MOD R/M field (described herein) the value of 11 in the MOD field; alternative embodiments of the invention do not store this and the other indicated bits herein in the inverted format. A value of 1 is used to encode the lower 16 registers. In other words, R'Rrrr is formed by combining EVEX.R', EVEX.R, and the other RRR from other fields.

Opcode map field 1015 (EVEX byte 1, bits [3:0]—mmmm)—its content encodes an implied leading opcode byte (0F, 0F 38, or 0F 3).

Data element width field 964 (EVEX byte 2, bit [7]—W)—is represented by the notation EVEX.W. EVEX.W is used to define the granularity (size) of the datatype (either 32-bit data elements or 64-bit data elements).

EVEX.vvvv 1020 (EVEX Byte 2, bits [6:3]—vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1020 encodes the 4 low-order bits of the first source register specifier stored in inverted (1s complement) form. Depending on the instruction, an extra different EVEX bit field is used to extend the specifier size to 32 registers.

EVEX.U 968 Class field (EVEX byte 2, bit [2]—U)—If EVEX.U=0, it indicates class A or EVEX.U0; if EVEX.U=1, it indicates class B or EVEX.U1.

Prefix encoding field 1025 (EVEX byte 2, bits [1:0]—pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 952 (EVEX byte 3, bit [7]—EH; also known as EVEX.EH, EVEX.rs, EVEX.RL, EVEX.write mask control, and EVEX.N; also illustrated with a)—as previously described, this field is context specific.

Beta field 954 (EVEX byte 3, bits [6:4]—SSS, also known as EVEX.s2-0, EVEX.r2-0, EVEX.rr1, EVEX.LL0, EVEX.LLB; also illustrated with βββ)—as previously described, this field is context specific.

REX' field 1010—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 970 (EVEX byte 3, bits [2:0]—kkk)—its content specifies the index of a register in the write mask registers as previously described. In one embodiment of the invention, the specific value EVEX kkk=000 has a special behavior implying no write mask is used for the particular instruction (this may be implemented in a variety of ways including the use of a write mask hardwired to all ones or hardware that bypasses the masking hardware).

Real Opcode Field 1030 (Byte 4) is also known as the opcode byte. Part of the opcode is specified in this field.

MOD R/M Field 1040 (Byte 5) includes MOD field 1042, Reg field 1044, and R/M field 1046. As previously described, the MOD field's 1042 content distinguishes between memory access and non-memory access operations. The role of Reg field 1044 can be summarized to two situations: encoding either the destination register operand or a source register operand, or be treated as an opcode extension and not used to encode any instruction operand. The role of R/M field 1046 may include the following: encoding the instruction operand that references a memory address, or encoding either the destination register operand or a source register operand.

Scale, Index, Base (SIB) Byte 1050 (Byte 6)—As previously described, the scale field's 960 content is used for memory address generation. SIB.SS 1052, SIB.xxx 1054 and SIB.bbb 1056—the contents of these fields have been previously referred to with regard to the register indexes Xxxx and Bbbb.

Displacement field 962A (Bytes 7-10)—when MOD field 1042 contains 10, bytes 7-10 are the displacement field 962A, and it works the same as the legacy 32-bit displacement (disp32) and works at byte granularity.

Displacement factor field 962B (Byte 7)—when MOD field 1042 contains 01, byte 7 is the displacement factor field 962B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 962B is a reinterpretation of disp8; when using displacement factor field 962B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 962B substitutes the legacy x86 instruction set 8-bit displacement. Thus, the displacement factor field 962B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 972 operates as previously described.

Full Opcode Field

FIG. 10B is a block diagram illustrating the fields of the specific vector friendly instruction format 1000 that make up the full opcode field 974 according to one embodiment of the invention. Specifically, the full opcode field 974 includes the format field 940, the base operation field 942, and the data element width (W) field 964. The base operation field 942 includes the prefix encoding field 1025, the opcode map field 1015, and the real opcode field 1030.

Register Index Field

FIG. 10C is a block diagram illustrating the fields of the specific vector friendly instruction format 1000 that make up the register index field 944 according to one embodiment of the invention. Specifically, the register index field 944 includes the REX field 1005, the REX' field 1010, the MODR/M.reg field 1044, the MODR/M.r/m field 1046, the VVVV field 1020, xxx field 1054, and the bbb field 1056.

Augmentation Operation Field

Figure 10D:
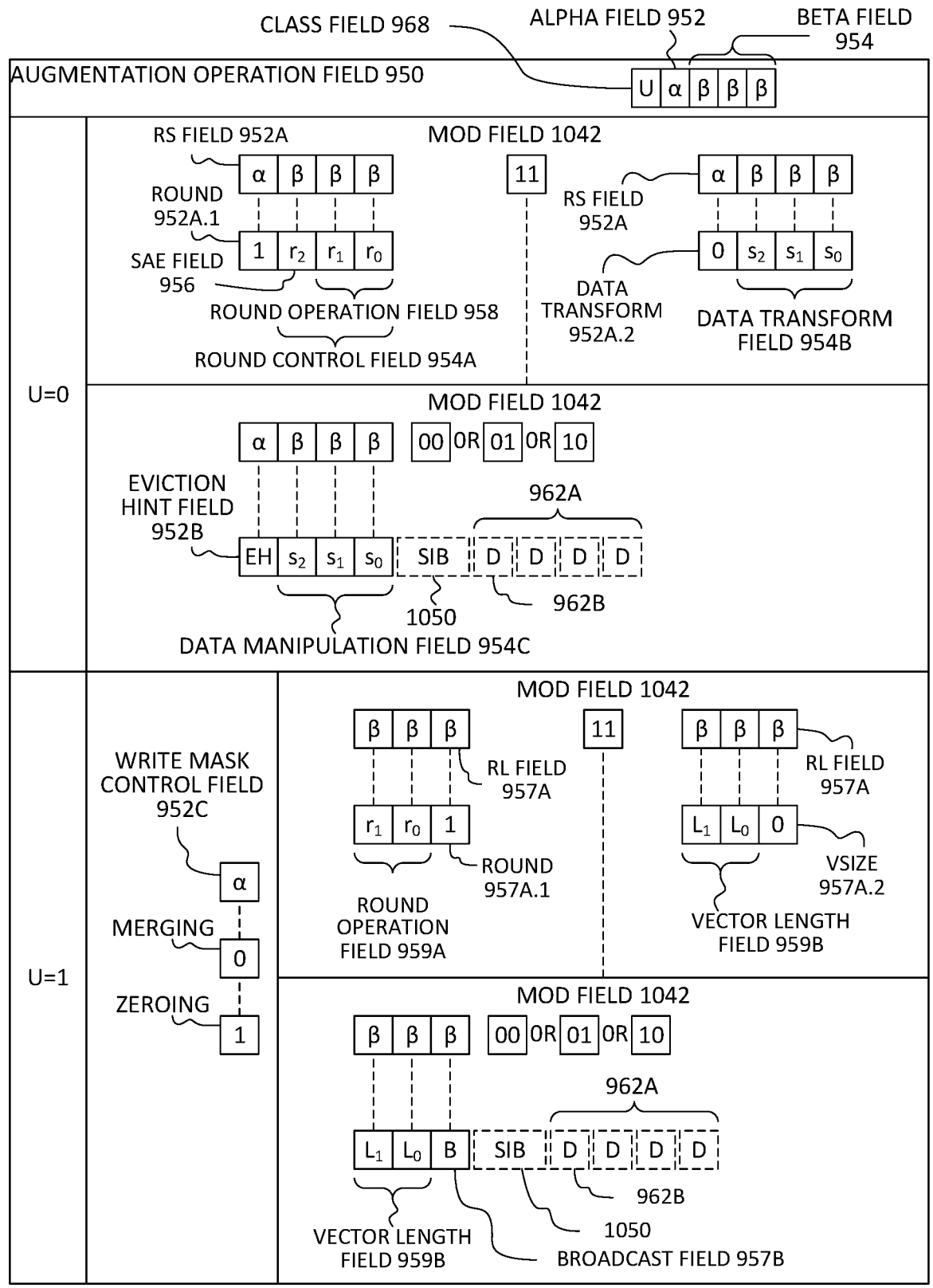

FIG. 10D is a block diagram illustrating the fields of the specific vector friendly instruction format 1000 that make up the augmentation operation field 950 according to one embodiment of the invention. When the class (U) field 968 contains 0, it signifies EVEX.U0 (class A 968A); when it contains 1, it signifies EVEX.U1 (class B 968B). When U=0 and the MOD field 1042 contains 11 (signifying a no memory access operation), the alpha field 952 (EVEX byte 3, bit [7]—EH) is interpreted as the rs field 952A. When the rs field 952A contains a 1 (round 952A.1), the beta field 954 (EVEX byte 3, bits [6:4]—SSS) is interpreted as the round control field 954A. The round control field 954A includes a one bit SAE field 956 and a two bit round operation field 958. When the rs field 952A contains a 0 (data transform 952A.2), the beta field 954 (EVEX byte 3, bits [6:4]—SSS) is interpreted as a three bit data transform field 954B. When U=0 and the MOD field 1042 contains 00, 01, or 10 (signifying a memory access operation), the alpha field 952

(EVEX byte 3, bit [7]—EH) is interpreted as the eviction hint (EH) field 952B and the beta field 954 (EVEX byte 3, bits [6:4]—SSS) is interpreted as a three bit data manipulation field 954C.

When U=1, the alpha field 952 (EVEX byte 3, bit [7]—EH) is interpreted as the write mask control (Z) field 952C. When U=1 and the MOD field 1042 contains 11 (signifying a no memory access operation), part of the beta field 954 (EVEX byte 3, bit [4]—SO) is interpreted as the RL field 957A; when it contains a 1 (round 957A.1) the rest of the beta field 954 (EVEX byte 3, bit [6-5]—S2-1) is interpreted as the round operation field 959A, while when the RL field 957A contains a 0 (VSIZE 957.A2) the rest of the beta field 954 (EVEX byte 3, bit [6-5]—S2-1) is interpreted as the vector length field 959B (EVEX byte 3, bit [6-5]—L1-0). When U=1 and the MOD field 1042 contains 00, 01, or 10 (signifying a memory access operation), the beta field 954 (EVEX byte 3, bits [6:4]—SSS) is interpreted as the vector length field 959B (EVEX byte 3, bit [6-5]—L1-0) and the broadcast field 957B (EVEX byte 3, bit [4]—B).

Exemplary Register Architecture

Figure 11:
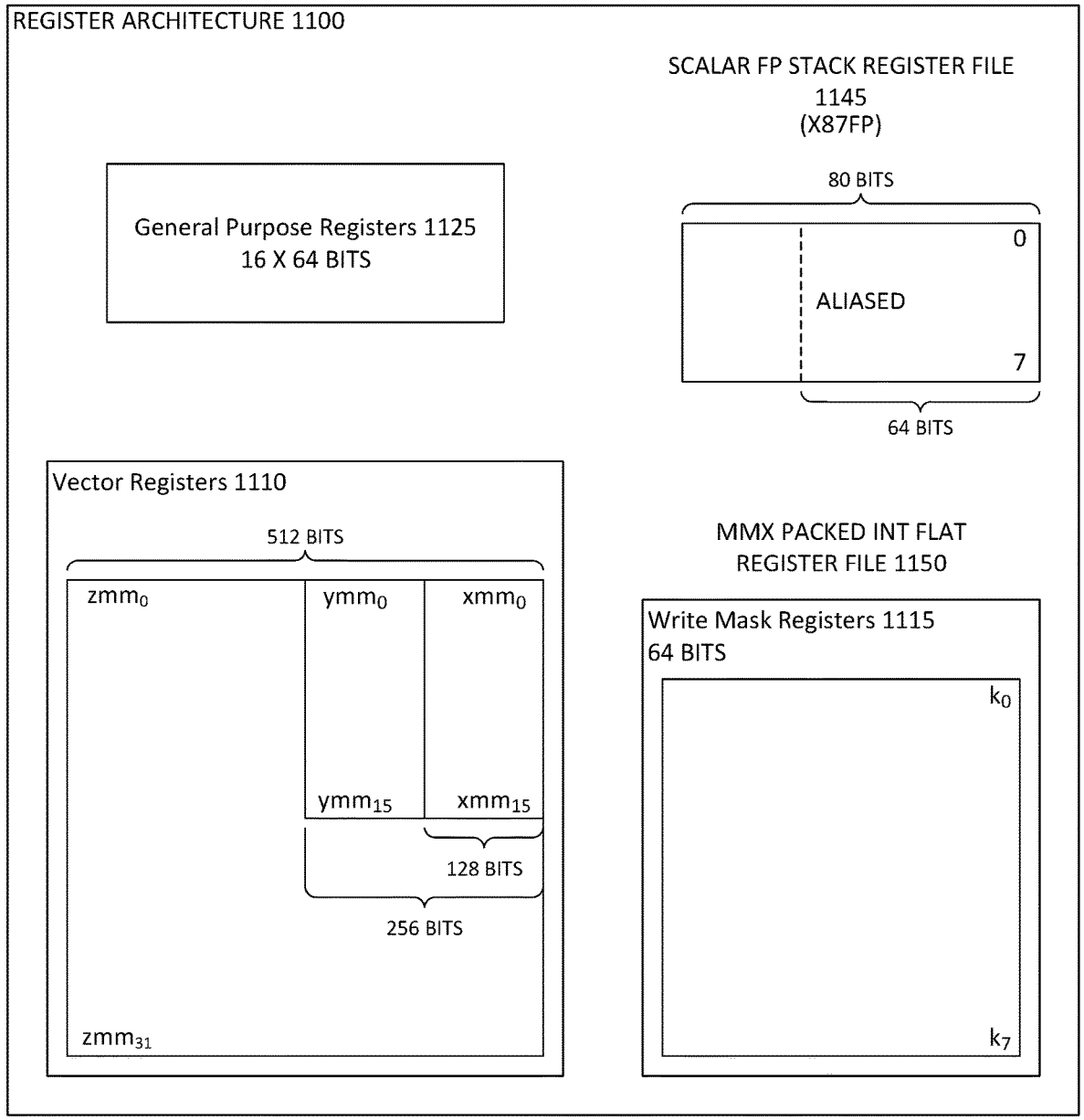
FIG. 11 is a block diagram of a register architecture according to one embodiment of the invention.

FIG. 11 is a block diagram of a register architecture 1100 according to one embodiment of the invention. In the embodiment illustrated, there are 32 vector registers 1110 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1000 operates on these overlaid register file as illustrated in the below tables.

General-purpose registers 1125—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1145, on which is aliased the MMX packed integer flat register file 1150—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing;

| Adjustable Vector Length | Class | Operations | Registers |
| --- | --- | --- | --- |
| Instruction Templates that do not include the vector length field 959B | A (FIG. 9A; U = 0) | 910, 915, 925, 930 | zmm registers (the vector length is 64 byte) |
| | B (FIG. 9B; U = 1) | 912 | zmm registers (the vector length is 64 byte) |
| Instruction templates that do include the vector length field 959B | B (FIG. 9B; U = 1) | 917, 927 | zmm, ymm, or xmm registers (the vector length is 64 byte, 32 byte, or 16 byte) depending on the vector length field 959B |

In other words, the vector length field 959B selects between a maximum length and one or more other shorter lengths, where each such shorter length is half the length of the preceding length; and instructions templates without the vector length field 959B operate on the maximum vector length. Further, in one embodiment, the class B instruction templates of the specific vector friendly instruction format 1000 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 1115—in the embodiment illustrated, there are 8 write mask registers (k0 through k7), each 64 bits in size. In an alternate embodiment, the write mask registers 1115 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 12A is a block diagram illustrating both an exemplary in-order pipeline and an exemplary register renaming, out-of-order issue/execution pipeline according to embodiments of the invention. FIG. 12B is a block diagram illustrating both an exemplary embodiment of an in-order architecture core and an exemplary register renaming, out-of-order issue/execution architecture core to be included in a processor according to embodiments of the invention. The solid lined boxes in FIGS. 12A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 12A, a processor pipeline 1200 includes a fetch stage 1202, a length decode stage 1204, a decode stage 1206, an allocation stage 1208, a renaming stage 1210, a scheduling (also known as a dispatch or issue) stage 1212, a register read/memory read stage 1214, an execute stage 1216, a write back/memory write stage 1218, an exception handling stage 1222, and a commit stage 1224.

FIG. 12B shows processor core 1290 including a front end unit 1230 coupled to an execution engine unit 1250, and both are coupled to a memory unit 1270. The core 1290 may be a reduced instruction set computing (RISC) core, a complex instruction set computing (CISC) core, a very long instruction word (VLIW) core, or a hybrid or alternative core type. As yet another option, the core 1290 may be a special-purpose core, such as, for example, a network or communication core, compression engine, coprocessor core, general purpose computing graphics processing unit (GPGPU) core, graphics core, or the like.

The front end unit 1230 includes a branch prediction unit 1232 coupled to an instruction cache unit 1234, which is coupled to an instruction translation lookaside buffer (TLB) 1236, which is coupled to an instruction fetch unit 1238, which is coupled to a decode unit 1240. The decode unit 1240 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1240 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1290 includes a microcode ROM or other medium that stores microcode for certain macroinstructions (e.g., in decode unit 1240 or otherwise within the front end unit 1230). The decode unit 1240 is coupled to a rename/allocator unit 1252 in the execution engine unit 1250.

The execution engine unit 1250 includes the rename/allocator unit 1252 coupled to a retirement unit 1254 and a set of one or more scheduler unit(s) 1256. The scheduler unit(s) 1256 represents any number of different schedulers, including reservations stations, central instruction window, etc. The scheduler unit(s) 1256 is coupled to the physical register file(s) unit(s) 1258. Each of the physical register file(s) units 1258 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1258 comprises a vector registers unit, a write mask registers unit, and a scalar registers unit. These register units may provide architectural vector registers, vector mask registers, and general purpose registers. The physical register file(s) unit(s) 1258 is overlapped by the retirement unit 1254 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1254 and the physical register file(s) unit(s) 1258 are coupled to the execution cluster(s) 1260. The execution cluster(s) 1260 includes a set of one or more execution units 1262 and a set of one or more memory access units 1264. The execution units 1262 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1256, physical register file(s) unit(s) 1258, and execution cluster(s) 1260 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1264). It should also be understood that where separate pipelines are used, one or more of these pipelines may be out-of-order issue/execution and the rest in-order.

The set of memory access units 1264 is coupled to the memory unit 1270, which includes a data TLB unit 1272 coupled to a data cache unit 1274 coupled to a level 2 (L2) cache unit 1276. In one exemplary embodiment, the memory access units 1264 may include a load unit, a store address unit, and a store data unit, each of which is coupled to the data TLB unit 1272 in the memory unit 1270. The instruction cache unit 1234 is further coupled to a level 2 (L2) cache unit 1276 in the memory unit 1270. The L2 cache unit 1276 is coupled to one or more other levels of cache and eventually to a main memory.

By way of example, the exemplary register renaming, out-of-order issue/execution core architecture may implement the pipeline 1200 as follows: 1) the instruction fetch 1238 performs the fetch and length decoding stages 1202 and 1204; 2) the decode unit 1240 performs the decode stage 1206; 3) the rename/allocator unit 1252 performs the allocation stage 1208 and renaming stage 1210; 4) the scheduler unit(s) 1256 performs the schedule stage 1212; 5) the physical register file(s) unit(s) 1258 and the memory unit 1270 perform the register read/memory read stage 1214; the execution cluster 1260 perform the execute stage 1216; 6) the memory unit 1270 and the physical register file(s) unit(s) 1258 perform the write back/memory write stage 1218; 7) various units may be involved in the exception handling stage 1222; and 8) the retirement unit 1254 and the physical register file(s) unit(s) 1258 perform the commit stage 1224.

The core 1290 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1290 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1234/1274 and a shared L2 cache unit 1276, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 13A:
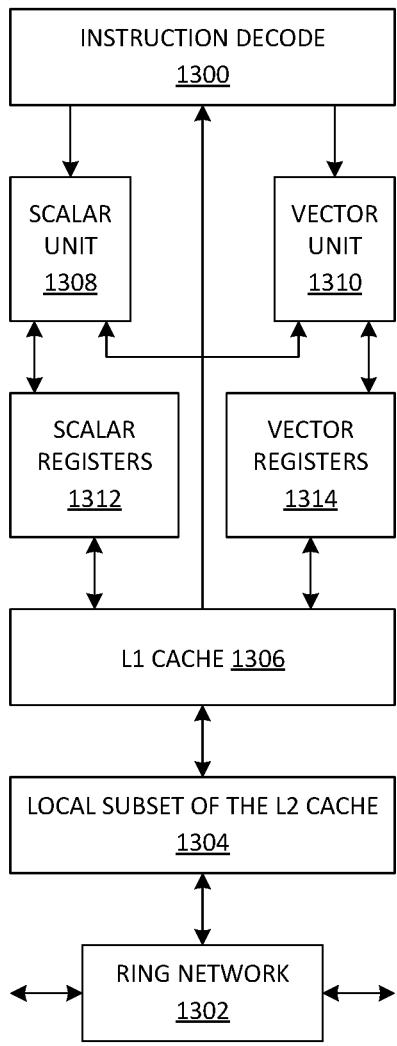
FIGS. 13A through 13B illustrate a block diagram of a more specific exemplary in-order core architecture, which core would be one of several logic blocks (including other cores of the same type and/or different types) in a chip.
Figure 13B:
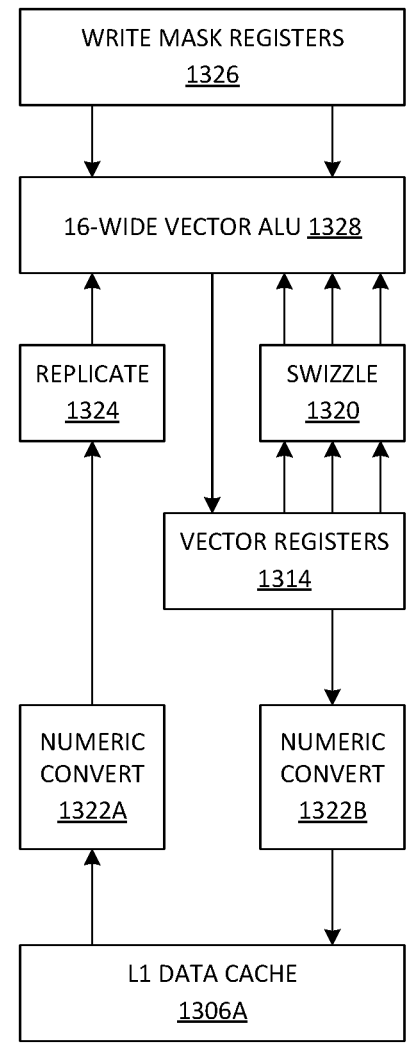

FIGS. 13A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 13A is a block diagram of a single processor core, along with its connection to the on-die interconnect network 1302 and with its local subset of the Level 2 (L2) cache 1304, according to embodiments of the invention. In one embodiment, an instruction decoder 1300 supports the x86 instruction set with a packed data instruction set extension. An L1 cache 1306 allows low-latency accesses to cache memory into the scalar and vector units. While in one embodiment (to simplify the design), a scalar unit 1308 and a vector unit 1310 use separate register sets (respectively, scalar registers 1312 and vector registers 1314) and data transferred between them is written to memory and then read back in from a level 1 (L1) cache 1306, alternative embodiments of the invention may use a different approach (e.g., use a single register set or include a communication path that allow data to be transferred between the two register files without being written and read back).

The local subset of the L2 cache 1304 is part of a global L2 cache that is divided into separate local subsets, one per processor core. Each processor core has a direct access path to its own local subset of the L2 cache 1304. Data read by a processor core is stored in its L2 cache subset 1304 and can be accessed quickly, in parallel with other processor cores accessing their own local L2 cache subsets. Data written by a processor core is stored in its own L2 cache subset 1304 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 13B is an expanded view of part of the processor core in FIG. 13A according to embodiments of the invention. FIG. 13B includes an L1 data cache 1306A part of the L1 cache 1306, as well as more detail regarding the vector unit 1310 and the vector registers 1314. Specifically, the vector unit 1310 is a 16-wide vector processing unit (VPU) (see the 16-wide ALU 1328), which executes one or more of integer, single-precision float, and double-precision float instructions. The VPU supports swizzling the register inputs with swizzle unit 1320, numeric conversion with numeric convert units 1322A-B, and replication with replication unit 1324 on the memory input. Write mask registers 1326 allow predicating resulting vector writes.

Figure 14:
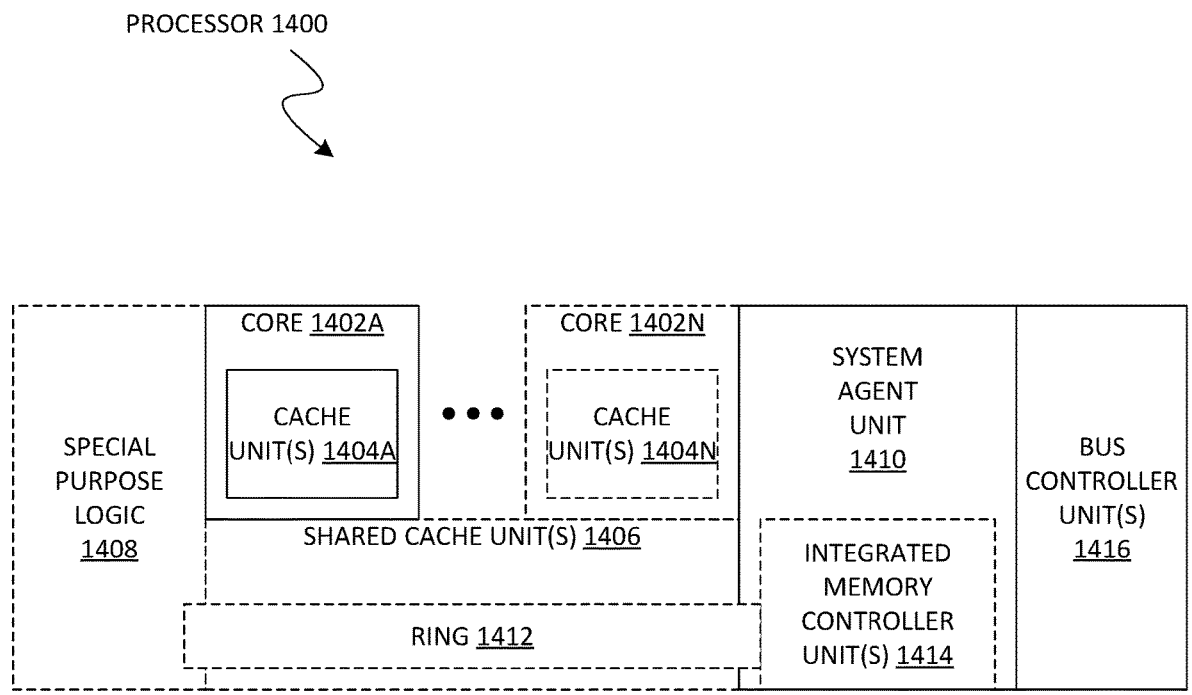
FIG. 14 is a block diagram of a processor that may have more than one core, may have an integrated memory controller, and may have integrated graphics according to embodiments of the invention.

FIG. 14 is a block diagram of a processor 1400 that may have more than one core, may have an integrated memory controller, and may have integrated graphics according to embodiments of the invention. The solid lined boxes in FIG. 14 illustrate a processor 1400 with a single core 1402A, a system agent 1410, a set of one or more bus controller units 1416, while the optional addition of the dashed lined boxes illustrates an alternative processor 1400 with multiple cores 1402A-N, a set of one or more integrated memory controller unit(s) 1414 in the system agent unit 1410, and special purpose logic 1408.

Thus, different implementations of the processor 1400 may include: 1) a CPU with the special purpose logic 1408 being integrated graphics and/or scientific (throughput) logic (which may include one or more cores), and the cores 1402A-N being one or more general purpose cores (e.g., general purpose in-order cores, general purpose out-of-order cores, a combination of the two); 2) a coprocessor with the cores 1402A-N being a large number of special purpose cores intended primarily for graphics and/or scientific (throughput); and 3) a coprocessor with the cores 1402A-N being a large number of general purpose in-order cores. Thus, the processor 1400 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1400 may be a part of and/or may be implemented on one or more substrates using any of a number of process technologies, such as, for example, BiCMOS, CMOS, or NMOS.

The memory hierarchy includes respective one or more levels of caches 1404A-N within cores 1402A-N, a set or one or more shared cache units 1406, and external memory (not shown) coupled to the set of integrated memory controller units 1414. The set of shared cache units 1406 may include one or more mid-level caches, such as level 2 (L2), level 3 (L3), level 4 (L4), or other levels of cache, a last level cache (LLC), and/or combinations thereof. While in one embodiment a ring based interconnect unit 1412 interconnects the special purpose logic 1408, the set of shared cache units 1406, and the system agent unit 1410/integrated memory controller unit(s) 1414, alternative embodiments may use any number of well-known techniques for interconnecting such units. In one embodiment, coherency is maintained between one or more cache units 1406 and cores 1402-A-N.

In some embodiments, one or more of the cores 1402A-N are capable of multi-threading. The system agent 1410 includes those components coordinating and operating cores 1402A-N. The system agent unit 1410 may include for example a power control unit (PCU) and a display unit. The PCU may be or include logic and components needed for regulating the power state of the cores 1402A-N and the special purpose logic 1408. The display unit is for driving one or more externally connected displays.

The cores 1402A-N may be homogenous or heterogeneous in terms of architecture instruction set; that is, two or more of the cores 1402A-N may be capable of execution the same instruction set, while others may be capable of executing only a subset of that instruction set or a different instruction set.

Exemplary Computer Architectures

FIGS. 15 through 18 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 15:
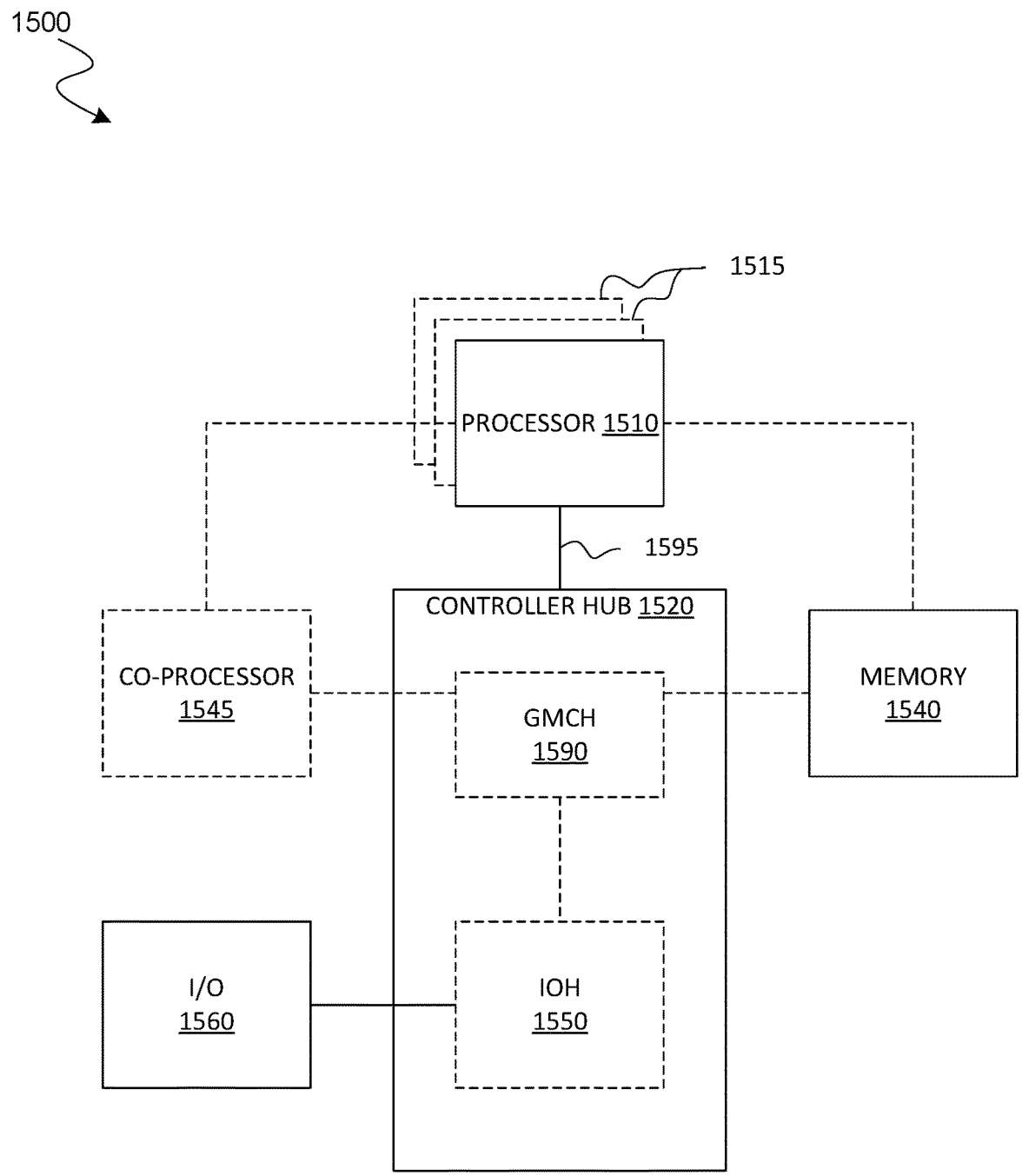
FIGS. 15 through 18 are block diagrams of exemplary computer architectures.

Referring now to FIG. 15, shown is a block diagram of a system 1500 in accordance with one embodiment of the present invention. The system 1500 may include one or more processors 1510, 1515, which are coupled to a controller hub 1520. In one embodiment the controller hub 1520 includes a graphics memory controller hub (GMCH) 1590 and an Input/Output Hub (IOH) 1550 (which may be on separate chips); the GMCH 1590 includes memory and graphics controllers to which are coupled memory 1540 and a coprocessor 1545; the IOH 1550 couples input/output (I/O) devices 1560 to the GMCH 1590. Alternatively, one or both of the memory and graphics controllers are integrated within the processor (as described herein), the memory 1540 and the coprocessor 1545 are coupled directly to the processor 1510, and the controller hub 1520 in a single chip with the IOH 1550.

The optional nature of additional processors 1515 is denoted in FIG. 15 with broken lines. Each processor 1510, 1515 may include one or more of the processing cores described herein and may be some version of the processor 1400.

The memory 1540 may be, for example, dynamic random access memory (DRAM), phase change memory (PCM), or a combination of the two. For at least one embodiment, the controller hub 1520 communicates with the processor(s) 1510, 1515 via a multi-drop bus, such as a frontside bus (FSB), point-to-point interface such as QuickPath Interconnect (QPI), or similar connection 1595.

In one embodiment, the coprocessor 1545 is a special-purpose processor, such as, for example, a high-throughput MIC processor, a network or communication processor, compression engine, graphics processor, GPGPU, embedded processor, or the like. In one embodiment, controller hub 1520 may include an integrated graphics accelerator.

There can be a variety of differences between the processors 1510, 1515 in terms of a spectrum of metrics of merit including architectural, microarchitectural, thermal, power consumption characteristics, and the like.

In one embodiment, the processor 1510 executes instructions that control data processing operations of a general type. Embedded within the instructions may be coprocessor instructions. The processor 1510 recognizes these coprocessor instructions as being of a type that should be executed by the attached coprocessor 1545. Accordingly, the processor 1510 issues these coprocessor instructions (or control signals representing coprocessor instructions) on a coprocessor bus or other interconnect, to coprocessor 1545. Coprocessor(s) 1545 accept and execute the received coprocessor instructions.

Figure 16:
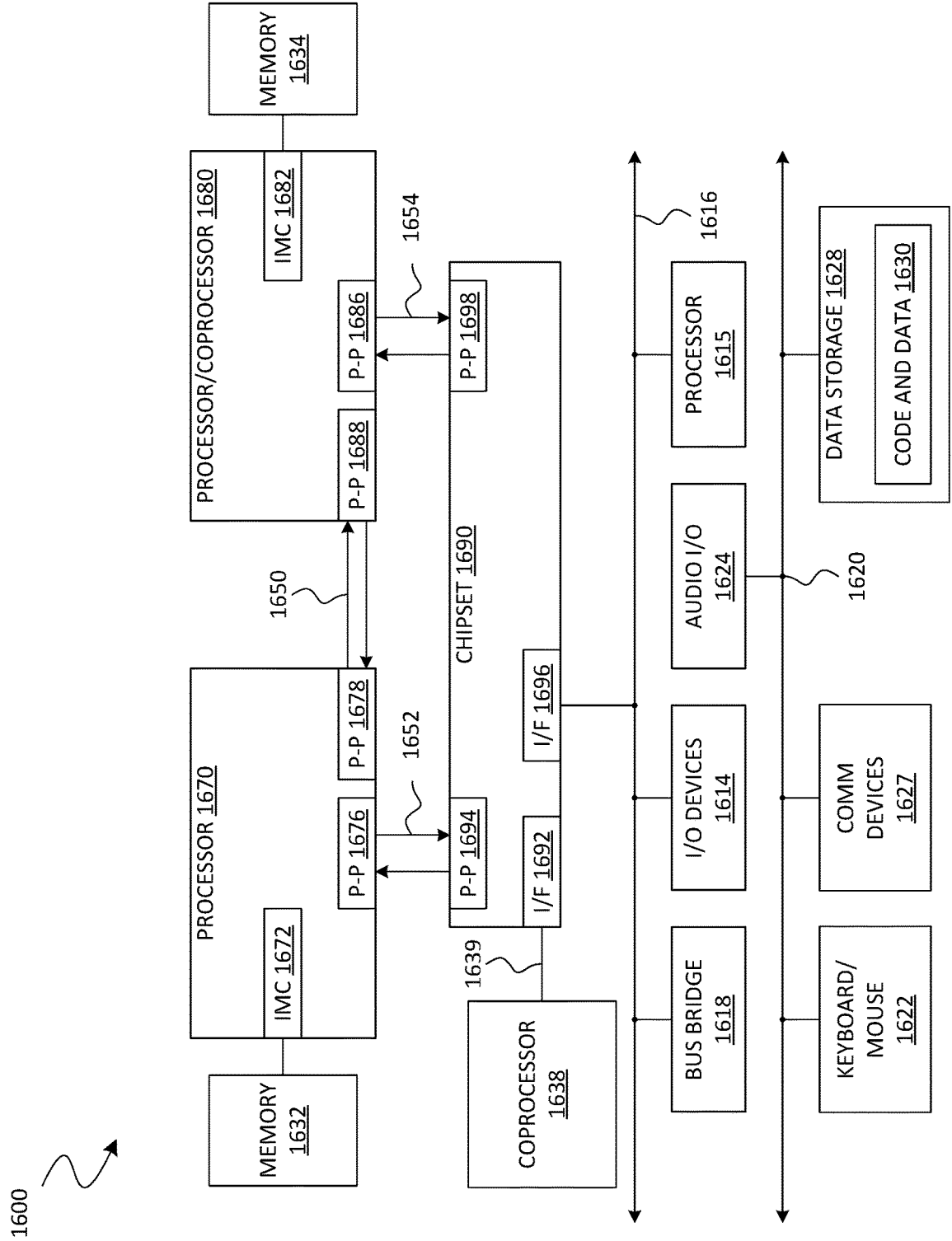

Referring now to FIG. 16, shown is a block diagram of a first more specific exemplary system 1600 in accordance with an embodiment of the present invention. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of the processor 1400. In one embodiment of the invention, processors 1670 and 1680 are respectively processors 1510 and 1515, while coprocessor 1638 is coprocessor 1545. In another embodiment, processors 1670 and 1680 are respectively processor 1510 coprocessor 1545.

Processors 1670 and 1680 are shown including integrated memory controller (IMC) units 1672 and 1682, respectively. Processor 1670 also includes as part of its bus controller unit's point-to-point (P-P) interfaces 1676 and 1678; similarly, second processor 1680 includes P-P interfaces 1686 and 1688. Processors 1670, 1680 may exchange information via a point-to-point (P-P) interconnect 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 may each exchange information with a chipset 1690 via individual P-P interfaces 1652, 1654 using point to point interface circuits 1676, 1694, 1686, 1698. Chipset 1690 may optionally exchange information with the coprocessor 1638 via a high-performance interface 1692 and an interconnect 1639. In one embodiment, the coprocessor 1638 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1690 may be coupled to a first bus 1616 via an interface 1696. In one embodiment, first bus 1616 may be a Peripheral Component Interconnect (PCI) bus, or a bus such as a PCI Express bus or another third generation I/O interconnect bus, although the scope of the present invention is not so limited.

As shown in FIG. 16, various I/O devices 1614 may be coupled to first bus 1616, along with a bus bridge 1618 which couples first bus 1616 to a second bus 1620. In one embodiment, one or more additional processor(s) 1615, such as coprocessors, high-throughput MIC processors, GPGPU's, accelerators (such as, e.g., graphics accelerators or digital signal processing (DSP) units), field programmable gate arrays, or any other processor, are coupled to first bus 1616. In one embodiment, second bus 1620 may be a low pin count (LPC) bus. Various devices may be coupled to a second bus 1620 including, for example, a keyboard and/or mouse 1622, communication devices 1627 and a storage unit 1628 such as a disk drive or other mass storage device which may include instructions/code and data 1630, in one embodiment. Further, an audio I/O 1624 may be coupled to the second bus 1620. Note that other architectures are possible. For example, instead of the point-to-point architecture of FIG. 16, a system may implement a multi-drop bus or other such architecture.

Figure 17:
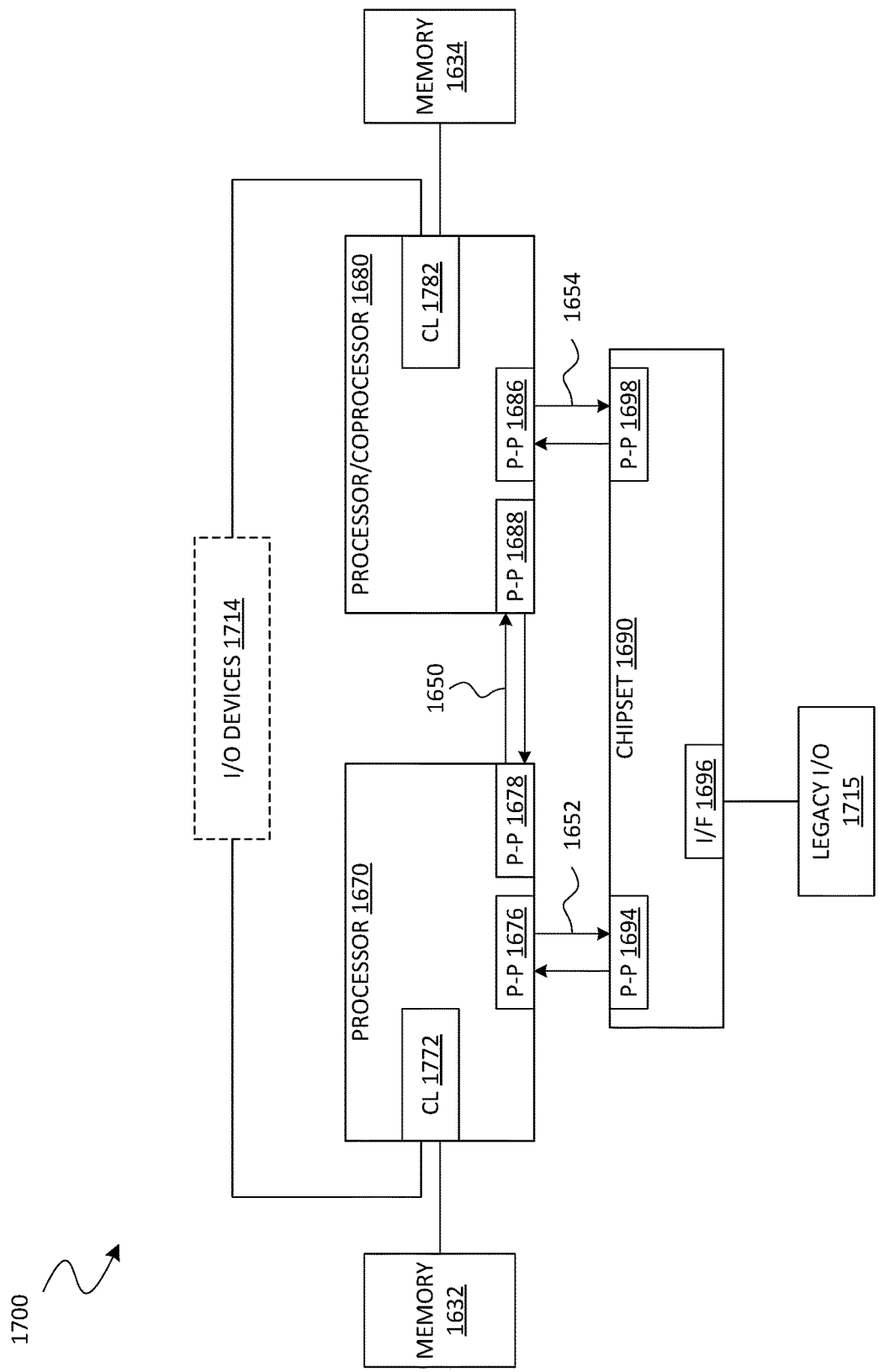

Referring now to FIG. 17, shown is a block diagram of a second more specific exemplary system 1700 in accordance with an embodiment of the present invention. Like elements in FIGS. 16 and 17 bear like reference numerals, and certain aspects of FIG. 16 have been omitted from FIG. 17 in order to avoid obscuring other aspects of FIG. 17.

FIG. 17 illustrates that the processors 1670, 1680 may include integrated memory and I/O control logic ("CL") 1772 and 1782, respectively. Thus, the CL 1772, 1782 include integrated memory controller units and include I/O control logic. FIG. 17 illustrates that not only are the memories 1632, 1634 coupled to the CL 1772, 1782, but also that I/O devices 1714 are also coupled to the control logic 1772, 1782. Legacy I/O devices 1715 are coupled to the chipset 1690.

Figure 18:
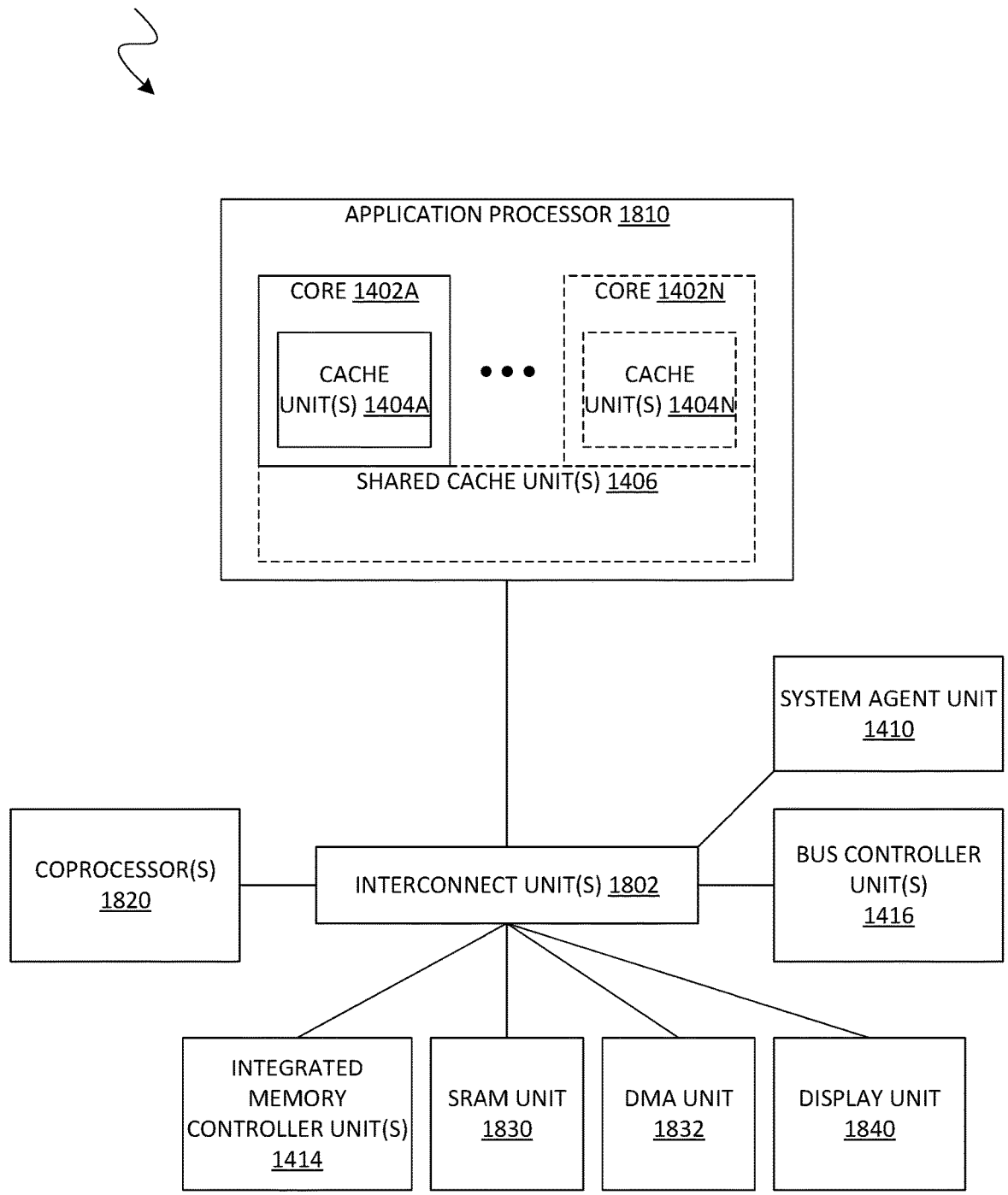

Referring now to FIG. 18, shown is a block diagram of a SoC 1800 in accordance with an embodiment of the present invention. Similar elements in FIG. 14 bear like reference numerals. Also, dashed lined boxes are optional features on more advanced SoCs. In FIG. 18, an interconnect unit(s) 1802 is coupled to: an application processor 1810 which includes a set of one or more cores 1402A-N and shared cache unit(s) 1406; a system agent unit 1410; a bus controller unit(s) 1416; an integrated memory controller unit(s) 1414; a set or one or more coprocessors 1820 which may include integrated graphics logic, an image processor, an audio processor, and a video processor; an static random access memory (SRAM) unit 1830; a direct memory access (DMA) unit 1832; and a display unit 1840 for coupling to one or more external displays. In one embodiment, the coprocessor(s) 1820 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1630 illustrated in FIG. 16, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 19:
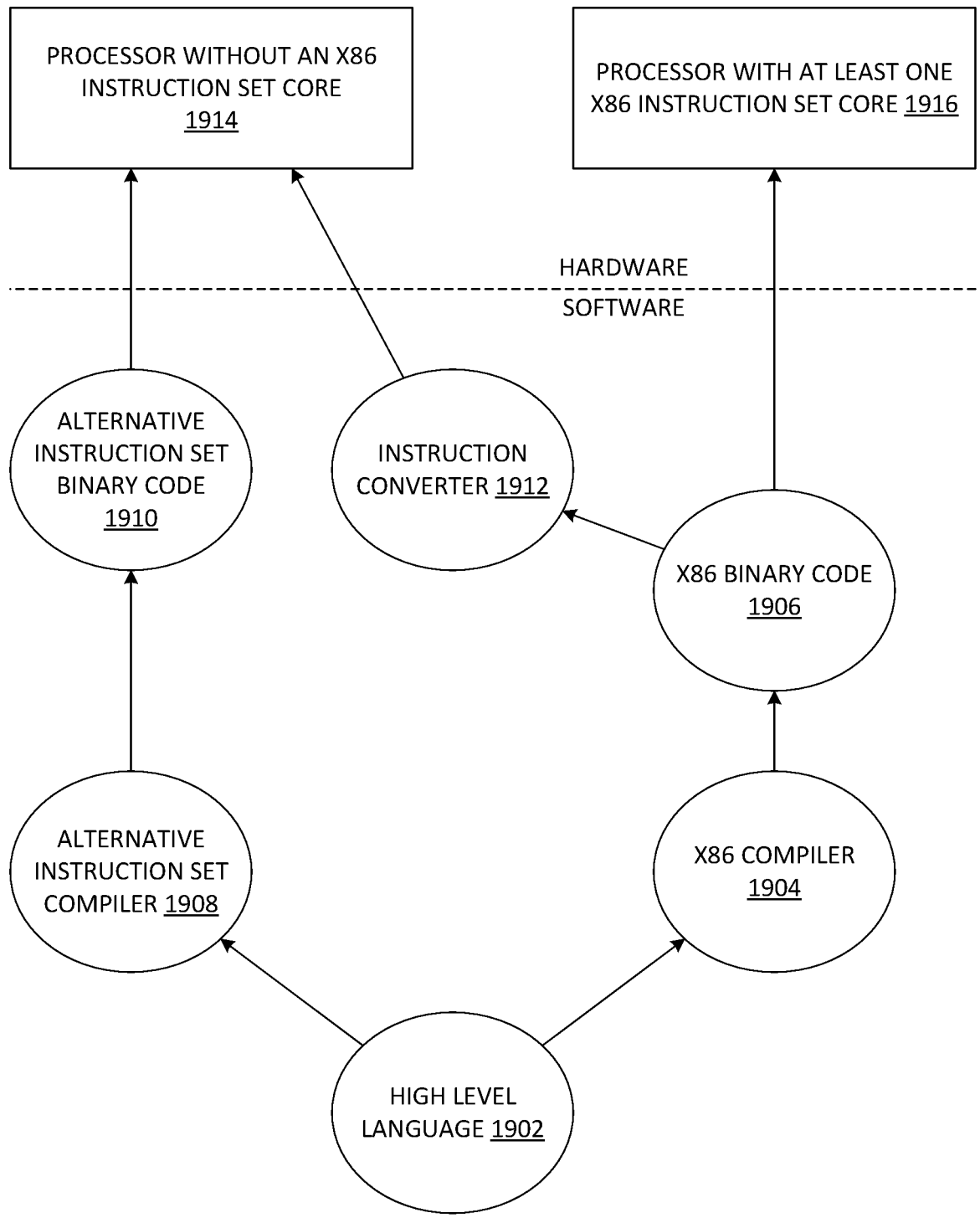
FIG. 19 is a block diagram contrasting the use of a software instruction converter to convert binary instructions in a source instruction set to binary instructions in a target instruction set according to embodiments of the invention.

FIG. 19 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 19 shows a program in a high level language 1902 may be compiled using an x86 compiler 1904 to generate x86 binary code 1906 that may be natively executed by a processor with at least one x86 instruction set core 1916. The processor with at least one x86 instruction set core 1916 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1904 represents a compiler that is operable to generate x86 binary code 1906 (e.g., object code) that can, with or without additional linkage processing, be executed on the processor with at least one x86 instruction set core 1916. Similarly, FIG. 19 shows the program in the high level language 1902 may be compiled using an alternative instruction set compiler 1908 to generate alternative instruction set binary code 1910 that may be natively executed by a processor without at least one x86 instruction set core 1914 (e.g., a processor with cores that execute the MIPS instruction set of MIPS Technologies of Sunnyvale, CA and/or that execute the ARM instruction set of ARM Holdings of Sunnyvale, CA). The instruction converter 1912 is used to convert the x86 binary code 1906 into code that may be natively executed by the processor without an x86 instruction set core 1914. This converted code is not likely to be the same as the alternative instruction set binary code 1910 because an instruction converter capable of this is difficult to make; however, the converted code will accomplish the general operation and be made up of instructions from the alternative instruction set. Thus, the instruction converter 1912 represents software, firmware, hardware, or a combination thereof that, through emulation, simulation or any other process, allows a processor or other electronic device that does not have an x86 instruction set processor or core to execute the x86 binary code 1906.

In one or more first embodiments, an integrated circuit comprises first circuitry to determine that a branch predict table (BTB) is to provide a first entry which corresponds to a first instruction, wherein the first circuitry is to identify first address information which corresponds to the first instruction, second circuitry, coupled to the first circuitry, to perform an evaluation, based on a classification of the first instruction as one of a fake branch instruction type, to detect whether the BTB comprises another entry which corresponds both to the first address information, and to a respective instruction which is of the fake branch instruction type, and third circuitry, coupled to the second circuitry, to provide a first double prediction eligibility state (DPES) parameter of the first entry based on the evaluation, wherein, for each entry of multiple entries of the BTB, a respective DPES parameter of the entry specifies a presence or an absence of a respective eligibility of a prediction, based on the instruction which corresponds to the entry, to be provided in a same fetch cycle with another prediction based on another instruction.

In one or more second embodiments, further to the first embodiment, the integrated circuit further comprises fourth circuitry to perform a search of the BTB based on a linear address which corresponds to a fetch region under consideration, wherein the search identifies one or more entries of the BTB, and send one or more predictions, during a single fetch cycle, each to a respective branch prediction queue, wherein a total number of the one or more predictions is based on one or more DPES parameters of the one or more entries.

In one or more third embodiments, further to the second embodiment, the fourth circuitry is to detect a condition wherein two entries of the BTB are hit by the search, wherein the respective DPES parameter of one of the two entries indicates the presence of the respective eligibility, and wherein the respective DPES parameter of the other of the two entries indicates the absence of the respective eligibility, and determine, based on the condition, whether the one of the two entries comes before the other of the two entries in a sequence of instructions.

In one or more fourth embodiments, further to the third embodiment, where the one of the two entries comes before the another of the two entries in the sequence of instructions, the fourth circuitry is to send two predictions during the single fetch cycle based on the search.

In one or more fifth embodiments, further to the third embodiment, where the one of the two entries comes after the another of the two entries in the sequence of instructions, the fourth circuitry is to send only one prediction during the single fetch cycle based on the search.

In one or more sixth embodiments, further to the second embodiment, the fourth circuitry is to detect a condition wherein only one entry of the BTB is hit by the search, and wherein, based on the condition, the fourth circuitry is to send only one prediction during the single fetch cycle based on the search.

In one or more seventh embodiments, further to the first embodiment or the second embodiment, the second circuitry is to detect a condition wherein, for any entry of the BTB which is detected by the evaluation, the respective DPES parameter of the entry indicates the absence of the respective eligibility, and wherein, based on the condition, the third circuitry is to indicate with the first DPES parameter the presence of the respective eligibility.

In one or more eighth embodiments, further to any of the first through second embodiments, the second circuitry is to detect a condition wherein, for one entry of the BTB which is detected by the evaluation, the respective DPES parameter of the entry indicates the presence of the respective eligibility, and wherein, based on the condition, the third circuitry is to indicate with the first DPES parameter the absence of the respective eligibility.

In one or more ninth embodiments, further to any of the first through second embodiments, the BTB is a set associative BTB comprising sets and ways, and wherein the first circuitry to identify the first address information comprises the first circuitry to generate, based on an address corresponding to the first instruction a tag value corresponding to one of the sets, and an index value corresponding to one or more ways of the one of the sets, and wherein the second circuitry is to perform the evaluation to detect whether the BTB comprises another entry which corresponds to the tag value and to the index value.

In one or more tenth embodiments, a method comprises determining that a branch predict table (BTB) is to provide a first entry which corresponds to a first instruction, comprising identifying first address information which corresponds to the first instruction, performing an evaluation, based on a classification of the first instruction as one of a fake branch instruction type, to detect whether the BTB comprises another entry which corresponds both to the first address information, and to a respective instruction which is of the fake branch instruction type, and providing a first double prediction eligibility state (DPES) parameter of the first entry based on the evaluation, wherein, for each entry of multiple entries of the BTB, a respective DPES parameter of the entry specifies a presence or an absence of a respective eligibility of a prediction, based on the instruction which corresponds to the entry, to be provided in a same fetch cycle with another prediction based on another instruction.

In one or more eleventh embodiments, further to the tenth embodiment, the method further comprises performing a search of the BTB based on a linear address which corresponds to a fetch region under consideration, wherein the search identifies one or more entries of the BTB, and sending one or more predictions, during a single fetch cycle, each to a respective branch prediction queue, wherein a total number of the one or more predictions is based on one or more DPES parameters of the one or more entries.

In one or more twelfth embodiments, further to the eleventh embodiment, performing the search comprises detecting a condition wherein two entries of the BTB are hit by the search, wherein the respective DPES parameter of one of the two entries indicates the presence of the respective eligibility, and wherein the respective DPES parameter of the other of the two entries indicates the absence of the respective eligibility, and determining, based on the condition, whether the one of the two entries comes before the other of the two entries in a sequence of instructions.

In one or more thirteenth embodiments, further to the twelfth embodiment, where the one of the two entries comes before the another of the two entries in the sequence of instructions, two predictions are sent during the single fetch cycle based on the search.

In one or more fourteenth embodiments, further to the twelfth embodiment, where the one of the two entries comes after the another of the two entries in the sequence of instructions, only one prediction is sent during the single fetch cycle based on the search.

In one or more fifteenth embodiments, further to the eleventh embodiment, performing the search comprises detecting a condition wherein only one entry of the BTB is hit by the search, and wherein, based on the condition, only one prediction is sent during the single fetch cycle based on the search.

In one or more sixteenth embodiments, further to the tenth embodiment or the eleventh embodiment, performing the evaluation comprises detecting a condition wherein, for any entry of the BTB which is detected by the evaluation, the respective DPES parameter of the entry indicates the absence of the respective eligibility, and wherein, based on the condition, the first DPES parameter indicates the presence of the respective eligibility.

In one or more seventeenth embodiments, further to any of the tenth through eleventh embodiments, performing the evaluation comprises detecting a condition wherein, for one entry of the BTB which is detected by the evaluation, the respective DPES parameter of the entry indicates the presence of the respective eligibility, and wherein, based on the condition, the first DPES parameter indicates the absence of the respective eligibility.

In one or more eighteenth embodiments, further to any of the tenth through eleventh embodiments, the BTB is a set associative BTB comprising sets and ways, and wherein identifying the first address information comprises generating, based on an address corresponding to the first instruction a tag value corresponding to one of the sets, and an index value corresponding to one or more ways of the one of the sets, and wherein the evaluation is to detect whether the BTB comprises another entry which corresponds to the tag value and to the index value. In one or more nineteenth embodiments, a system comprises a processor comprising branch predict table (BTB), first circuitry to determine that the BTB is to provide a first entry which corresponds to a first instruction, wherein the first circuitry is to identify first address information which corresponds to the first instruction, second circuitry, coupled to the first circuitry, to perform an evaluation, based on a classification of the first instruction as one of a fake branch instruction type, to detect whether the BTB comprises another entry which corresponds both to the first address information, and to a respective instruction which is of the fake branch instruction type, and third circuitry, coupled to the second circuitry, to provide a first double prediction eligibility state (DPES) parameter of the first entry based on the evaluation, wherein, for each entry of multiple entries of the BTB, a respective DPES parameter of the entry specifies a presence or an absence of a respective eligibility of a prediction, based on the instruction which corresponds to the entry, to be provided in a same fetch cycle with another prediction based on another instruction, and a display device coupled to the processor, the display device to display an image based on a signal communicated with the processor.

In one or more twentieth embodiments, further to the nineteenth embodiment, the processor further comprises fourth circuitry to perform a search of the BTB based on a linear address which corresponds to a fetch region under consideration, wherein the search identifies one or more entries of the BTB, and send one or more predictions, during a single fetch cycle, each to a respective branch prediction queue, wherein a total number of the one or more predictions is based on one or more DPES parameters of the one or more entries.

In one or more twenty-first embodiments, further to the twentieth embodiment, the fourth circuitry is to detect a condition wherein two entries of the BTB are hit by the search, wherein the respective DPES parameter of one of the two entries indicates the presence of the respective eligibility, and wherein the respective DPES parameter of the other of the two entries indicates the absence of the respective eligibility, and determine, based on the condition, whether the one of the two entries comes before the other of the two entries in a sequence of instructions.

In one or more twenty-second embodiments, further to the twenty-first embodiment, where the one of the two entries comes before the another of the two entries in the sequence of instructions, the fourth circuitry is to send two predictions during the single fetch cycle based on the search.

In one or more twenty-third embodiments, further to the twenty-first embodiment, where the one of the two entries comes after the another of the two entries in the sequence of instructions, the fourth circuitry is to send only one prediction during the single fetch cycle based on the search.

In one or more twenty-fourth embodiments, further to the twentieth embodiment, the fourth circuitry is to detect a condition wherein only one entry of the BTB is hit by the search, and wherein, based on the condition, the fourth circuitry is to send only one prediction during the single fetch cycle based on the search.

In one or more twenty-fifth embodiments, further to the nineteenth embodiment or the twentieth embodiment, the second circuitry is to detect a condition wherein, for any entry of the BTB which is detected by the evaluation, the respective DPES parameter of the entry indicates the absence of the respective eligibility, and wherein, based on the condition, the third circuitry is to indicate with the first DPES parameter the presence of the respective eligibility.

In one or more twenty-sixth embodiments, further to any of the nineteenth through twentieth embodiments, the second circuitry is to detect a condition wherein, for one entry of the BTB which is detected by the evaluation, the respective DPES parameter of the entry indicates the presence of the respective eligibility, and wherein, based on the condition, the third circuitry is to indicate with the first DPES parameter the absence of the respective eligibility.

In one or more twenty-seventh embodiments, further to any of the nineteenth through twentieth embodiments, the BTB is a set associative BTB comprising sets and ways, and wherein the first circuitry to identify the first address information comprises the first circuitry to generate, based on an address corresponding to the first instruction a tag value corresponding to one of the sets, and an index value corresponding to one or more ways of the one of the sets, and wherein the second circuitry is to perform the evaluation to detect whether the BTB comprises another entry which corresponds to the tag value and to the index value.

In one or more twenty-eighth embodiments, one or more non-transitory computer-readable storage media have stored thereon instructions which, when executed by one or more processing units, cause the one or more processing units to perform a method comprising determining that a branch predict table (BTB) is to provide a first entry which corresponds to a first instruction, comprising identifying first address information which corresponds to the first instruction, performing an evaluation, based on a classification of the first instruction as one of a fake branch instruction type, to detect whether the BTB comprises another entry which corresponds both to the first address information, and to a respective instruction which is of the fake branch instruction type, and providing a first double prediction eligibility state (DPES) parameter of the first entry based on the evaluation, wherein, for each entry of multiple entries of the BTB, a respective DPES parameter of the entry specifies a presence or an absence of a respective eligibility of a prediction, based on the instruction which corresponds to the entry, to be provided in a same fetch cycle with another prediction based on another instruction.

In one or more twenty-ninth embodiments, further to the twenty-eighth embodiment, the method further comprises performing a search of the BTB based on a linear address which corresponds to a fetch region under consideration, wherein the search identifies one or more entries of the BTB, and sending one or more predictions, during a single fetch cycle, each to a respective branch prediction queue, wherein a total number of the one or more predictions is based on one or more DPES parameters of the one or more entries.

In one or more thirtieth embodiments, further to the twenty-ninth embodiment, performing the search comprises detecting a condition wherein two entries of the BTB are hit by the search, wherein the respective DPES parameter of one of the two entries indicates the presence of the respective eligibility, and wherein the respective DPES parameter of the other of the two entries indicates the absence of the respective eligibility, and determining, based on the condition, whether the one of the two entries comes before the other of the two entries in a sequence of instructions.

In one or more thirty-first embodiments, further to the thirtieth embodiment, where the one of the two entries comes before the another of the two entries in the sequence of instructions, two predictions are sent during the single fetch cycle based on the search.

In one or more thirty-second embodiments, further to the thirtieth embodiment, where the one of the two entries comes after the another of the two entries in the sequence of instructions, only one prediction is sent during the single fetch cycle based on the search.

In one or more thirty-third embodiments, further to the twenty-ninth embodiment, performing the search comprises detecting a condition wherein only one entry of the BTB is hit by the search, and wherein, based on the condition, only one prediction is sent during the single fetch cycle based on the search.

In one or more thirty-fourth embodiments, further to the twenty-eighth embodiment or the twenty-ninth embodiment, performing the evaluation comprises detecting a condition wherein, for any entry of the BTB which is detected by the evaluation, the respective DPES parameter of the entry indicates the absence of the respective eligibility, and wherein, based on the condition, the first DPES parameter indicates the presence of the respective eligibility.

In one or more thirty-fifth embodiments, further to any of the twenty-eighth through twenty-ninth embodiments, performing the evaluation comprises detecting a condition wherein, for one entry of the BTB which is detected by the evaluation, the respective DPES parameter of the entry indicates the presence of the respective eligibility, and wherein, based on the condition, the first DPES parameter indicates the absence of the respective eligibility. In one or more thirty-sixth embodiments, further to any of the twenty-eighth through twenty-ninth embodiments, the BTB is a set associative BTB comprising sets and ways, and wherein identifying the first address information comprises generating, based on an address corresponding to the first instruction a tag value corresponding to one of the sets, and an index value corresponding to one or more ways of the one of the sets, and wherein the evaluation is to detect whether the BTB comprises another entry which corresponds to the tag value and to the index value.

Techniques and architectures for providing branch prediction information are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An integrated circuit comprising:
   first circuitry to determine that a branch predict table (BTB) is to provide a first entry which corresponds to a first instruction, wherein the first circuitry is to identify first address information which corresponds to the first instruction;
   second circuitry, coupled to the first circuitry, to perform an evaluation, based on a classification of the first instruction as one of a fake branch instruction type, to detect whether the BTB includes another entry which corresponds both to the first address information, and to a respective instruction which is of the fake branch instruction type; and
   third circuitry, coupled to the second circuitry, to provide a first double prediction eligibility state (DPES) parameter of the first entry based on the evaluation, wherein, for each entry of multiple entries of the BTB, a respective DPES parameter of the entry specifies a presence or an absence of a respective eligibility of a prediction, based on the instruction which corresponds to the entry, to be provided in a same fetch cycle with another prediction based on another instruction.

2. The integrated circuit of claim 1, further comprising fourth circuitry to:
   perform a search of the BTB based on a linear address which corresponds to a fetch region under consideration, wherein the search identifies one or more entries of the BTB; and
   send one or more predictions, during a single fetch cycle, each to a respective branch prediction queue, wherein a total number of the one or more predictions is based on one or more DPES parameters of the one or more entries.

3. The integrated circuit of claim 2, wherein the fourth circuitry is to:
   detect a condition wherein two entries of the BTB are hit by the search, wherein the respective DPES parameter of one of the two entries indicates the presence of the respective eligibility, and wherein the respective DPES parameter of the other of the two entries indicates the absence of the respective eligibility; and
   determine, based on the condition, whether the one of the two entries comes before the other of the two entries in a sequence of instructions.

4. The integrated circuit of claim 3, wherein, where the one of the two entries comes before the other of the two entries in the sequence of instructions, the fourth circuitry is to send two predictions during the single fetch cycle based on the search.

5. The integrated circuit of claim 1, wherein the second circuitry is to detect a condition wherein, for any entry of the BTB which is detected by the evaluation, the respective DPES parameter of the entry indicates the absence of the respective eligibility; and
   wherein, based on the condition, the third circuitry is to indicate with the first DPES parameter the presence of the respective eligibility.

6. The integrated circuit of claim 1, wherein the second circuitry is to detect a condition wherein, for one entry of the BTB which is detected by the evaluation, the respective DPES parameter of the entry indicates the presence of the respective eligibility; and
   wherein, based on the condition, the third circuitry is to indicate with the first DPES parameter the absence of the respective eligibility.

7. The integrated circuit of claim 1, wherein the BTB is a set associative BTB comprising sets and ways, and wherein the first circuitry to identify the first address information comprises the first circuitry to generate, based on an address corresponding to the first instruction:
   a tag value corresponding to one of the sets; and
   an index value corresponding to one or more ways of the one of the sets; and
   wherein the second circuitry is to perform the evaluation to detect whether the BTB includes another entry which corresponds to the tag value and to the index value.

8. A method comprising:
   determining that a branch predict table (BTB) is to provide a first entry which corresponds to a first instruction, including identifying first address information which corresponds to the first instruction;
   performing an evaluation, based on a classification of the first instruction as one of a fake branch instruction type, to detect whether the BTB includes another entry which corresponds both to the first address information, and to a respective instruction which is of the fake branch instruction type; and
   providing a first double prediction eligibility state (DPES) parameter of the first entry based on the evaluation, wherein, for each entry of multiple entries of the BTB, a respective DPES parameter of the entry specifies a presence or an absence of a respective eligibility of a prediction, based on the instruction which corresponds to the entry, to be provided in a same fetch cycle with another prediction based on another instruction.

9. The method of claim 8, further comprising:
   performing a search of the BTB based on a linear address which corresponds to a fetch region under consideration, wherein the search identifies one or more entries of the BTB; and
   sending one or more predictions, during a single fetch cycle, each to a respective branch prediction queue, wherein a total number of the one or more predictions is based on one or more DPES parameters of the one or more entries.

10. The method of claim 9, wherein performing the search comprises:

detecting a condition wherein two entries of the BTB are hit by the search, wherein the respective DPES parameter of one of the two entries indicates the presence of the respective eligibility, and wherein the respective DPES parameter of the other of the two entries indicates the absence of the respective eligibility; and determining, based on the condition, whether the one of the two entries comes before the other of the two entries in a sequence of instructions.

11. The method of claim 9, wherein performing the search comprises detecting a condition wherein only one entry of the BTB is hit by the search, and wherein, based on the condition, only one prediction is sent during the single fetch cycle based on the search.

12. The method of claim 8, wherein performing the evaluation comprises detecting a condition wherein, for any entry of the BTB which is detected by the evaluation, the respective DPES parameter of the entry indicates the absence of the respective eligibility; and wherein, based on the condition, the first DPES parameter indicates the presence of the respective eligibility.

13. The method of claim 8, wherein performing the evaluation comprises detecting a condition wherein, for one entry of the BTB which is detected by the evaluation, the respective DPES parameter of the entry indicates the presence of the respective eligibility; and wherein, based on the condition, the first DPES parameter indicates the absence of the respective eligibility.

14. The method of claim 8, wherein the BTB is a set associative BTB comprising sets and ways, and wherein identifying the first address information comprises generating, based on an address corresponding to the first instruction:

a tag value corresponding to one of the sets; and an index value corresponding to one or more ways of the one of the sets; and wherein the evaluation is to detect whether the BTB includes another entry which corresponds to the tag value and to the index value.

15. A system comprising:
a processor comprising:
branch predict table (BTB);
first circuitry to determine that the BTB is to provide a first entry which corresponds to a first instruction, wherein the first circuitry is to identify first address information which corresponds to the first instruction;

second circuitry, coupled to the first circuitry, to perform an evaluation, based on a classification of the first instruction as one of a fake branch instruction type, to detect whether the BTB includes another entry which corresponds both to the first address information, and to a respective instruction which is of the fake branch instruction type; and third circuitry, coupled to the second circuitry, to provide a first double prediction eligibility state (DPES) parameter of the first entry based on the evaluation, wherein, for each entry of multiple entries of the BTB, a respective DPES parameter of the entry specifies a presence or an absence of a respective eligibility of a prediction, based on the instruction which corresponds to the entry, to be provided in a same fetch cycle with another prediction based on another instruction; and a display device coupled to the processor, the display device to display an image based on a signal communicated with the processor.

16. The system of claim 15, the processor further comprising fourth circuitry to:

perform a search of the BTB based on a linear address which corresponds to a fetch region under consideration, wherein the search identifies one or more entries of the BTB; and send one or more predictions, during a single fetch cycle, each to a respective branch prediction queue, wherein a total number of the one or more predictions is based on one or more DPES parameters of the one or more entries.

17. The system of claim 16, wherein the fourth circuitry is to:

detect a condition wherein two entries of the BTB are hit by the search, wherein the respective DPES parameter of one of the two entries indicates the presence of the respective eligibility, and wherein the respective DPES parameter of the other of the two entries indicates the absence of the respective eligibility; and determine, based on the condition, whether the one of the two entries comes before the other of the two entries in a sequence of instructions.

18. The system of claim 15, wherein the second circuitry is to detect a condition wherein, for any entry of the BTB which is detected by the evaluation, the respective DPES parameter of the entry indicates the absence of the respective eligibility; and wherein, based on the condition, the third circuitry is to indicate with the first DPES parameter the presence of the respective eligibility.

19. The system of claim 15, wherein the second circuitry is to detect a condition wherein, for one entry of the BTB which is detected by the evaluation, the respective DPES parameter of the entry indicates the presence of the respective eligibility; and wherein, based on the condition, the third circuitry is to indicate with the first DPES parameter the absence of the respective eligibility.

20. The system of claim 15, wherein the BTB is a set associative BTB comprising sets and ways, and wherein the first circuitry to identify the first address information comprises the first circuitry to generate, based on an address corresponding to the first instruction:

a tag value corresponding to one of the sets; and an index value corresponding to one or more ways of the one of the sets; and wherein the second circuitry is to perform the evaluation to detect whether the BTB includes another entry which corresponds to the tag value and to the index value.

* * * * *